(12) United States Patent (10) Patent No.: US 12,699,268 B1

Zhao et al. (45) Date of Patent: Aug. 4, 2026

(54) NON-TELECENTRIC HOLOGRAPHIC OPTICAL ELEMENT IN AN EYE TRACKING SYSTEM

(71) Applicant: Meta Platforms Technologies, LLC, Menlo Park, CA (US)

(72) Inventors: Jianbo Zhao, Kirkland, WA (US); Yang Yang, Redmond, WA (US); Peter Johnsen, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 889 days.

(21) Appl. No.: 17/945,559

(22) Filed: Sep. 15, 2022

Related U.S. Application Data

(60) Provisional application No. 63/294,350, filed on Dec. 28, 2021.

(51) Int. Cl.
G02B 27/01 (2006.01)

(52) U.S. Cl.
CPC ..... G02B 27/0103 (2013.01); G02B 27/0179 (2013.01); G02B 2027/0109 (2013.01); G02B 2027/0178 (2013.01); G02B 2027/0187 (2013.01)

(58) Field of Classification Search
CPC ............ G02B 27/0103; G02B 27/0179; G02B 2027/0109; G02B 2027/0178; G02B 2027/0187
See application file for complete search history.

(56) References Cited

U.S. PATENT DOCUMENTS

| | | | | |
|---|---|---|---|---|
| 9,759,913 B2 * | 9/2017 | Saarikko | .............. | H04N 13/383 |
| 2006/0291021 A1 * | 12/2006 | Mukawa | ............ | G02B 27/0944 |
| | | | | 359/15 |
| 2016/0085300 A1 * | 3/2016 | Robbins | .............. | H04N 23/673 |
| | | | | 345/633 |
| 2019/0041634 A1 * | 2/2019 | Popovich | ................ | G01S 17/66 |
| 2020/0166756 A1 * | 5/2020 | DeLapp | .............. | G02B 6/0016 |
| 2022/0146819 A1 * | 5/2022 | Boyle | ................ | G02B 27/0093 |
| 2022/0334399 A1 * | 10/2022 | Ronen | ................ | G02B 27/0179 |

* cited by examiner

*Primary Examiner* — Thomas K Pham
*Assistant Examiner* — Jennifer A Jones
(74) *Attorney, Agent, or Firm* — Greenberg Traurig, LLP

(57) ABSTRACT

An apparatus, system, and method for a waveguide system may be used to support eye tracking in a head mounted display (HMD). The waveguide system may be positioned in a user's field of view and within a lens assembly of the HMD to capture light that is reflected from an eye. The waveguide system may include a holographic optical element (HOE) configured to in-couple light into a waveguide and direct the light to an out-coupling grating. The HOE may be configured to map a number of incident light rays to a corresponding number of total internal reflection (TIR) angles. The incident light rays may include at least some oblique light rays that are non-normal to an input surface of the HOE. The HOE may have a field of view (FOV) of an eyebox region that is at least partially outside of a periphery of the input surface of the HOE.

20 Claims, 14 Drawing Sheets

100

600
604
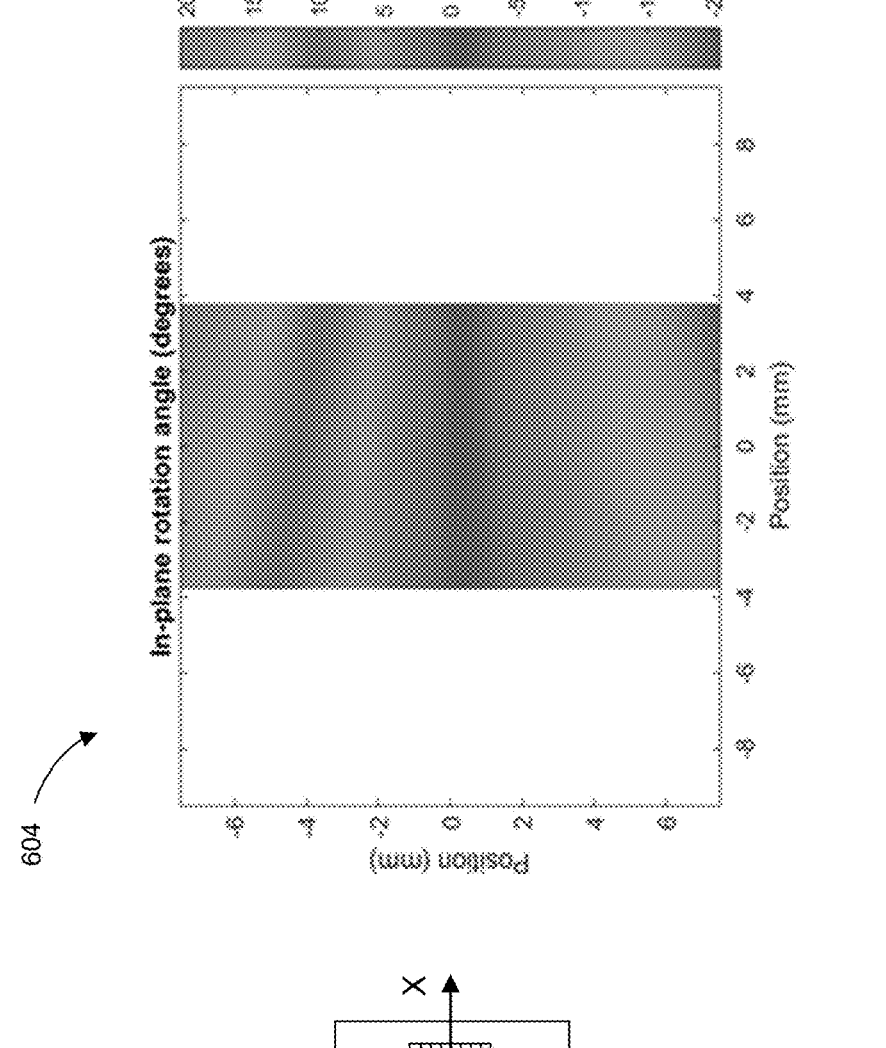
602
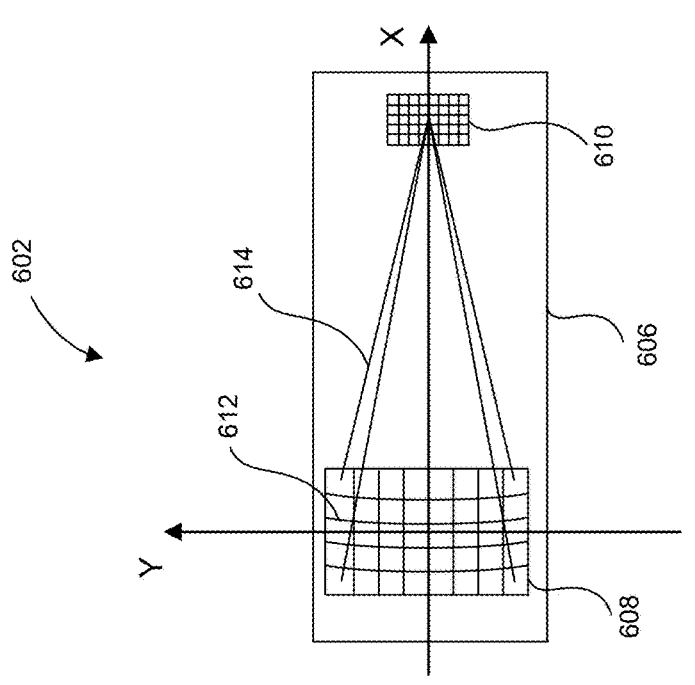
FIG. 6

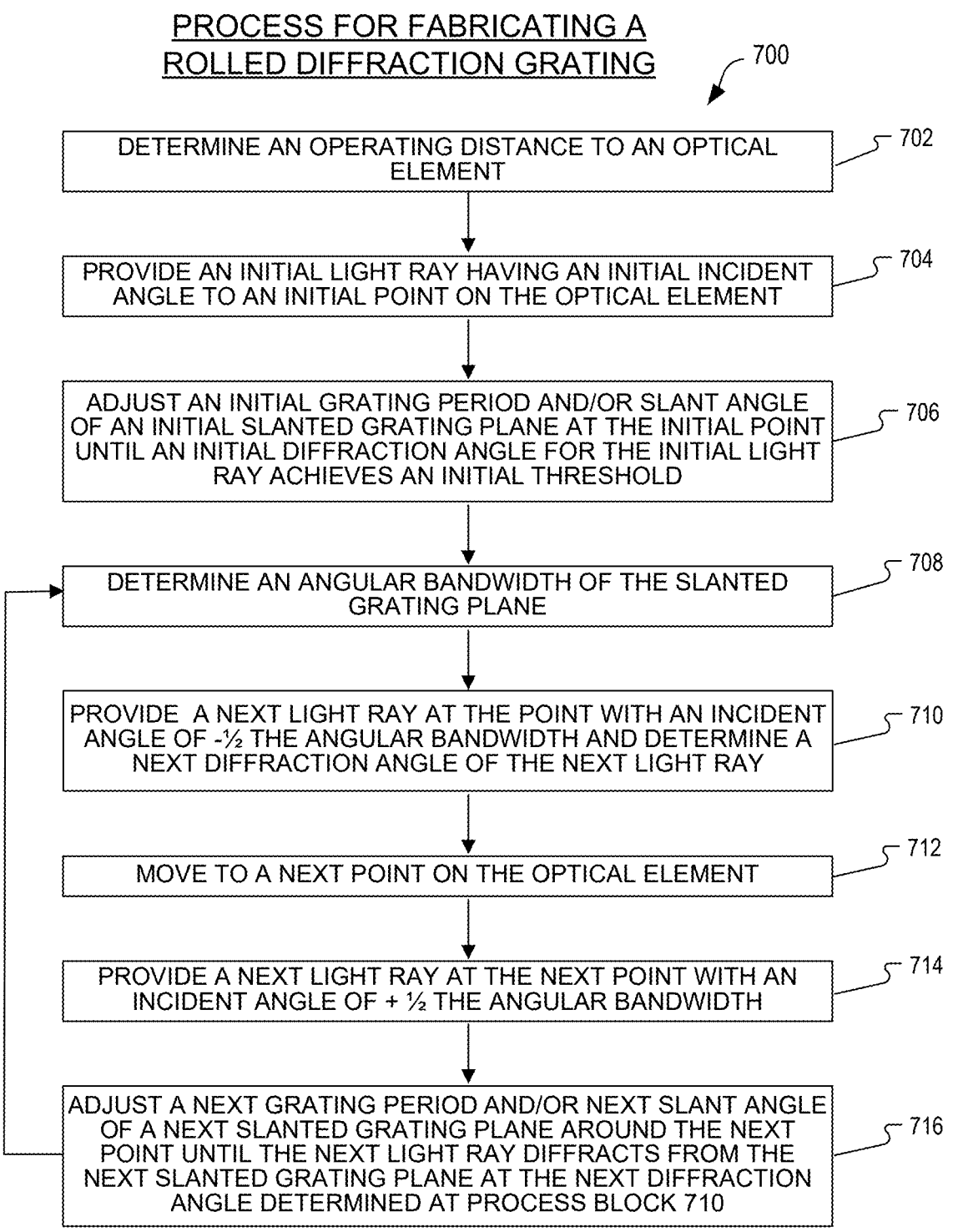

PROCESS FOR FABRICATING A
ROLLED DIFFRACTION GRATING     700

DETERMINE AN OPERATING DISTANCE TO AN OPTICAL ELEMENT     702

PROVIDE AN INITIAL LIGHT RAY HAVING AN INITIAL INCIDENT ANGLE TO AN INITIAL POINT ON THE OPTICAL ELEMENT     704

ADJUST AN INITIAL GRATING PERIOD AND/OR SLANT ANGLE OF AN INITIAL SLANTED GRATING PLANE AT THE INITIAL POINT UNTIL AN INITIAL DIFFRACTION ANGLE FOR THE INITIAL LIGHT RAY ACHIEVES AN INITIAL THRESHOLD     706

DETERMINE AN ANGULAR BANDWIDTH OF THE SLANTED GRATING PLANE     708

PROVIDE A NEXT LIGHT RAY AT THE POINT WITH AN INCIDENT ANGLE OF -½ THE ANGULAR BANDWIDTH AND DETERMINE A NEXT DIFFRACTION ANGLE OF THE NEXT LIGHT RAY     710

MOVE TO A NEXT POINT ON THE OPTICAL ELEMENT     712

PROVIDE A NEXT LIGHT RAY AT THE NEXT POINT WITH AN INCIDENT ANGLE OF + ½ THE ANGULAR BANDWIDTH     714

ADJUST A NEXT GRATING PERIOD AND/OR NEXT SLANT ANGLE OF A NEXT SLANTED GRATING PLANE AROUND THE NEXT POINT UNTIL THE NEXT LIGHT RAY DIFFRACTS FROM THE NEXT SLANTED GRATING PLANE AT THE NEXT DIFFRACTION ANGLE DETERMINED AT PROCESS BLOCK 710     716

FIG. 7

PROCESS FOR EYE TRACKING

900

1000

PROCESS FOR FABRICATING
A HOLOGRAPHIC OPTICAL ELEMENT

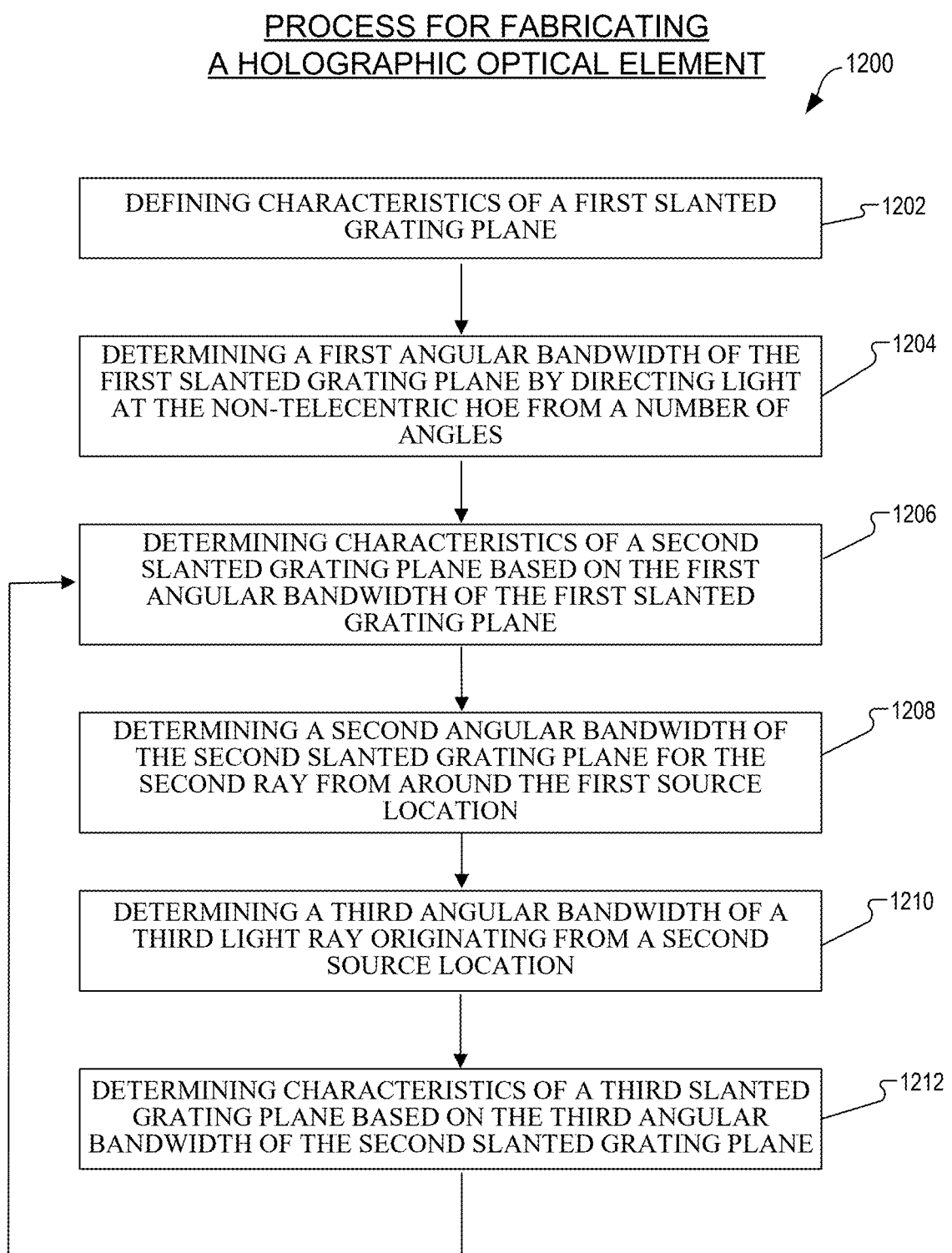

~1200

DEFINING CHARACTERISTICS OF A FIRST SLANTED
GRATING PLANE      ~1202

DETERMINING A FIRST ANGULAR BANDWIDTH OF THE
FIRST SLANTED GRATING PLANE BY DIRECTING LIGHT
AT THE NON-TELECENTRIC HOE FROM A NUMBER OF
ANGLES      ~1204

DETERMINING CHARACTERISTICS OF A SECOND
SLANTED GRATING PLANE BASED ON THE FIRST
ANGULAR BANDWIDTH OF THE FIRST SLANTED
GRATING PLANE      ~1206

DETERMINING A SECOND ANGULAR BANDWIDTH OF
THE SECOND SLANTED GRATING PLANE FOR THE
SECOND RAY FROM AROUND THE FIRST SOURCE
LOCATION      ~1208

DETERMINING A THIRD ANGULAR BANDWIDTH OF A
THIRD LIGHT RAY ORIGINATING FROM A SECOND
SOURCE LOCATION      ~1210

DETERMINING CHARACTERISTICS OF A THIRD SLANTED
GRATING PLANE BASED ON THE THIRD ANGULAR
BANDWIDTH OF THE SECOND SLANTED GRATING PLANE      ~1212

FIG. 12

PROCESS FOR FABRICATING
A HOLOGRAPHIC OPTICAL ELEMENT

1300

| ILLUMINATING A HOLOGRAPHIC OPTICAL ELEMENT (HOE) WITH A FIRST LIGHT RAY THAT IS OBLIQUE TO AN INPUT SURFACE OF THE HOE, WHEREIN THE FIRST LIGHT RAY ORIGINATES FROM OUTSIDE A PERIPHERY OF THE INPUT SURFACE |
1302

ADJUSTING CHARACTERISTICS OF A FIRST GRATING PLANE IN THE HOE UNTIL A FIRST DIFFRACTION ANGLE OF THE FIRST LIGHT RAY REACHES A FIRST PREDETERMINED DIFFRACTION ANGLE VALUE
1304

DETERMINING A FIRST ANGULAR BANDWIDTH OF THE FIRST GRATING PLANE
1306

ILLUMINATING THE HOE WITH ONE OR MORE ADDITIONAL LIGHT RAYS, WHEREIN AT LEAST SOME OF THE ONE OR MORE ADDITIONAL LIGHT RAYS ORIGINATE FROM OUTSIDE THE PERIPHERY OF THE INPUT SURFACE, WHEREIN INCIDENT ANGLES OF THE ONE OR MORE ADDITIONAL LIGHT RAYS ARE AT LEAST PARTIALLY BASED ON THE FIRST ANGULAR BANDWIDTH
1308

DEFINING CHARACTERISTICS OF ONE OR MORE ADDITIONAL GRATING PLANES IN THE HOE UNTIL ONE OR MORE ADDITIONAL DIFFRACTION ANGLES OF THE ONE OR MORE ADDITIONAL LIGHT RAYS BECOME ONE OR MORE ADDITIONAL PREDETERMINED DIFFRACTION ANGLE VALUES
1310

FIG. 13

NON-TELECENTRIC HOLOGRAPHIC OPTICAL ELEMENT IN AN EYE TRACKING SYSTEM

CROSS-REFERENCE TO RELATED APPLICATIONS

This application claims priority to U.S. Provisional Application No. 63/294,350 filed Dec. 28, 2021, which is hereby incorporated by reference.

TECHNICAL FIELD

This disclosure generally relates to optics, and in particular to eye tracking technologies.

BACKGROUND INFORMATION

Eye tracking technology enables head mounted displays (HMDs) to interact with users based on the users' eye movement or eye orientation. Existing eye tracking systems can be technically limited by natural obstructions. For example, eyelashes and eyelids can obstruct images taken of an eye, which may decrease the quality of eye tracking operations.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 6 illustrates a diagram of a top view of a waveguide system and a rotational angle chart for a rolled diffraction grating, in accordance with aspects of the disclosure.

FIG. 7 illustrates a flow diagram of a process for fabricating a rolled diffraction grating, in accordance with aspects of the disclosure.

FIG. 12 illustrates a diagram of a process of fabricating an HOE, in accordance with aspects of the disclosure.

FIG. 13 illustrates a diagram of a process of fabricating an HOE, in accordance with aspects of the disclosure.

DETAILED DESCRIPTION

Figure 1:
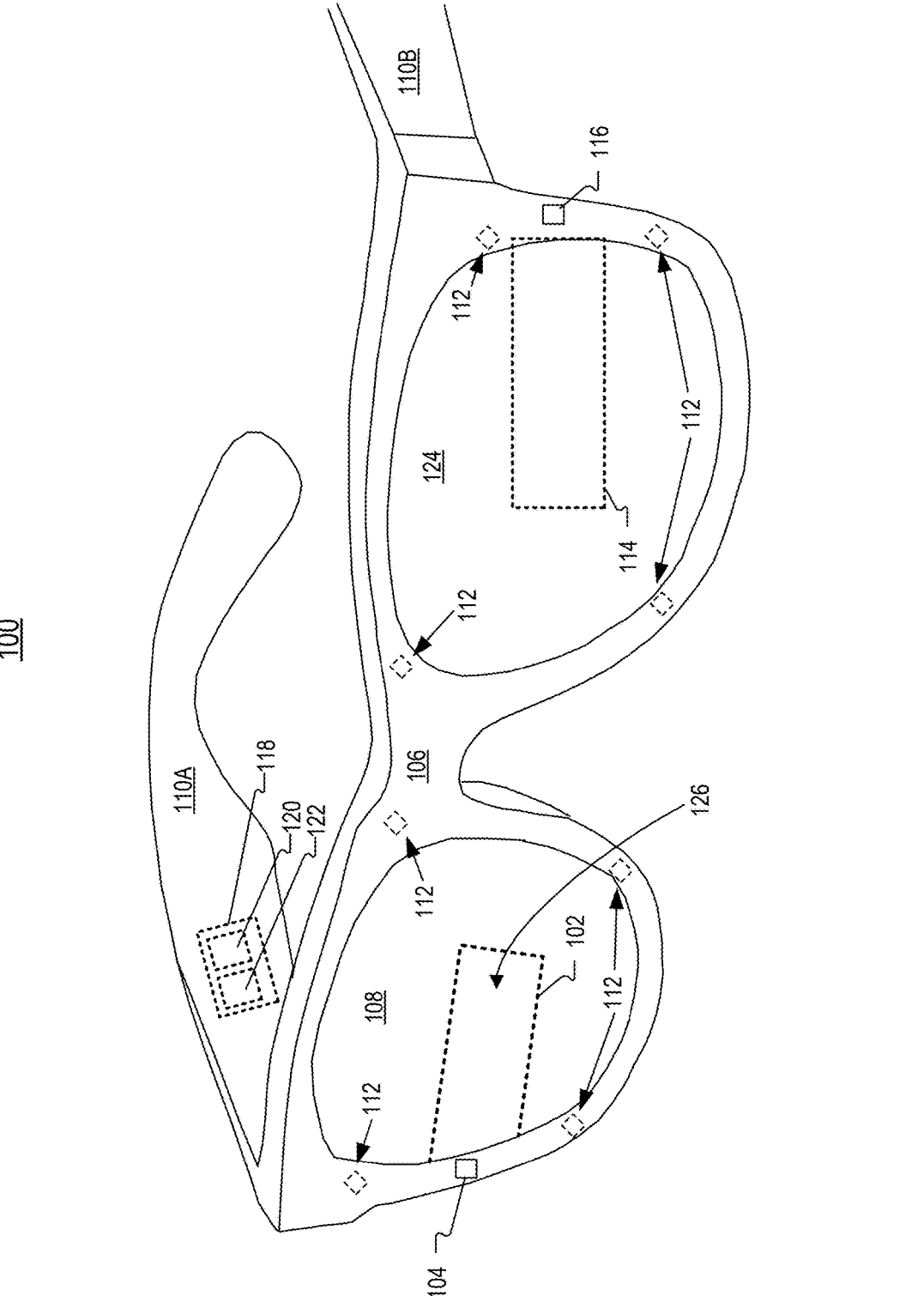
FIG. 1 illustrates a head mounted display, in accordance with aspects of the disclosure.

Embodiments of a non-telecentric holographic optical element (HOE) in an eye tracking system are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm to 700 nm. Non-visible light may be defined as light having wavelengths that are outside the visible light range, such as ultraviolet light and infrared light. In aspects of this disclosure, red light may be defined as having a wavelength range of approximately 620 to 750 nm, green light may be defined as having a wavelength range of approximately 495 to 570 nm, and blue light may be defined as having a wavelength range of approximately 450 to 495 nm.

As used herein, the angle of diffraction of light from an optical element (e.g., an optical coupler, a diffraction grating, holographic optical element, etc.) is an angle of displacement of an exit ray with reference to the normal (i.e., 90 degrees) of the exit surface of the optical element.

As used herein, a diffraction grating may include a ruled grating or a holographic grating. A holographic grating may include a substrate with a photosensitive material onto which gratings are recorded (e.g., internal to the substrate). A holographic grating may also be referred to as a holographic optical element (HOE).

As used herein, an incident angle may be measured with reference to a normal to the input surface (e.g., 1° incident angle is 1° from normal).

Eye tracking functionality expands the services and quality of interaction that head mounted displays (HMDs) can provide to users. Eyelashes and eyelids can block and inhibit the quality of signal (e.g., image) available from an eye when imaging is performed from a periphery of an eye. A significantly better position for imaging light reflections from an eye is from directly in front of the eye. However, placing a camera right in front of an eye could obstruct the vision of a user and could be an annoyance that reduces the quality of a user's experience with the HMD. Disclosed herein are techniques for a waveguide system that captures light from an eye, from directly in front of an eye, and from in the field of vision (in-field) of the eye. The waveguide system directs light from an in-field portion of a lens assembly to an image sensor that may be positioned on or in a frame of the HMD. Additionally, the waveguide system may use a non-telecentric HOE to in-couple reflections from an eyebox region, to expand the area within the eyebox region from which reflections can be detected.

An HMD may include a waveguide system that is at least partially disposed in a lens assembly and in a frame of the HMD to receive light reflections from a user's eye. The waveguide system may direct light reflections (e.g., infrared) from a user's eye to an image sensor to enable distraction-free and in-field imaging of a user's eye. The waveguide system may include one or more (e.g., three) in-coupling diffraction gratings, a waveguide, and an out-coupling diffraction grating. The in-coupling diffraction grating may be configured to in-couple light reflections from an eye (or eyebox region) into the waveguide. The in-coupling diffraction grating may be a non-telecentric HOE that is configured to in-coupled oblique light rays that originate from outside a periphery of the input surface of the non-telecentric HOE. The waveguide may direct (e.g., through total internal reflection (TIR)) the light from the in-coupling diffraction grating to one or more out-coupling diffraction gratings. The out-coupling diffraction grating may be configured to out-couple the light from the waveguide to one or more image sensors (e.g., through a lens).

The in-coupling diffraction gratings may be a non-telecentric HOE that is configured to map (or encode) an incident position of each light ray to a TIR angle, where the incident position is with respect to a surface of the in-coupling diffraction grating. In other words, the TIR angle of a particular light ray may be indicative of a position for which the light ray was received on the in-coupling diffraction grating and may be indicative of a source location of the light ray in the eyebox region. The non-telecentric HOE may have a plurality of slanted grating planes that are configured to map oblique light rays to corresponding TIR angles by operating (in transmission or reflection) to diffract the light rays into the waveguide.

The out-coupling diffraction grating may then be configured to decode the incident position of each light ray based on the diffraction angle of the particular light ray. In one embodiment, the exit angle or exit position of a light ray from the out-coupling diffraction grating is proportional or is related to the incident position of the particular light ray.

A controller may be communicatively coupled to the image sensor to receive image data from the image sensor. The controller may use the image data to determine an orientation of the eye(s) and/or to perform one or more eye tracking operations. Based on eye orientations and/or eye tracking data, the HMD may be configured to selectively display information and/or provide or adjust a number of user interface elements in the lens assembly of the HMD, in accordance with aspects of the disclosure.

The in-coupling diffraction grating and the out-coupling diffraction grating may be implemented as transmissive diffraction gratings or as reflective diffraction gratings. A transmissive diffraction grating operates in transmission on a particular wavelength of light (e.g., within the infrared range) and simply passes or transmits other wavelengths without diffraction. A reflective diffraction grating operates in reflection on a particular wavelength of light (e.g., within the infrared range) and passes or transmits other wavelengths without diffraction. The footprint, surface area, and/or volume of the in-coupling diffraction grating may be larger than the footprint, surface area, and/or volume of the out-coupling diffraction grating to facilitate capturing light reflections from an eyebox and to facilitate focusing light onto an image sensor that is within the frame of the HMD.

The non-telecentric HOE may be a rolled diffraction grating having a number of slanted diffraction gratings or slanted grating planes that are recorded within the volume of the optical element. The slanted grating planes diffract light into the waveguide. The slanted grating planes may diffract light with a different diffraction angle on a first end of the in-coupling diffraction grating than on a second end of the in-coupling diffraction grating. The slanted grating planes may have slant angles that change (e.g., increase or decrease) from the first end of the in-coupling diffraction grating to the second end of the in-coupling diffraction, according to aspects of the disclosure. The slanted grating planes may be designed or configured to operate on a particular range of wavelengths (e.g., particular near-infrared or infrared wavelengths). The slanted grating planes may have slant angles, grating lines, and grating periods that are defined based on diffraction angles and angular bandwidths of one or more adjacent slanted grating planes, in accordance with embodiments of the disclosure.

The apparatus, system, and method for a waveguide system having a non-telecentric HOE that is described in this disclosure may enable improvements in eye tracking technologies, for example, to support operations of an HMD. These and other embodiments are described in more detail in connection with FIGS. 1-13.

FIG. 1 illustrates an example head mounted display (HMD) 100 that supports eye tracking from within the field of vision (in-field) of a user, in accordance with embodiments of the disclosure. HMD 100 includes a waveguide system 102 that is configured to in-couple light from an eyebox region and out-couple the light from the eyebox region to an image sensor 104 that is positioned in or on a frame 106, according to an embodiment. Waveguide system 102 is partially disposed within a lens assembly 108 and is partially positioned within frame 106, to support in-field reception of light reflected from an eyebox region, according to an embodiment. An advantage of in-field imaging of the eyebox region and a user's eye is that positioning waveguide system 102 in front of a user's eye reduces obstructions such as eyelids and eyelashes that may reduce the quality of images that can be captured from a user's eye. Another advantage of in-field imaging of the eyebox region may be improved reception of reflections from the user's eye, according to aspects of the disclosure. Waveguide system 102 may be used to support eye tracking, user experience (UX), and other features of HMD 100. An HMD, such as HMD 100, is one type of head mounted display, typically worn on the head of a user to provide artificial reality content to the user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

HMD 100 carries waveguide system 102 and image sensor 104 with frame 106. Frame 106 is coupled to arms 110A and 110B. Lens assembly 108 is mounted to, inserted into, or otherwise carried by frame 106. Lens assembly 108 may include a prescription optical layer matched to a particular user of HMD 100 or may be a non-prescription lens. The illustrated HMD 100 is configured to be worn on or about a head of a wearer of HMD 100.

Lens assembly 108 may appear transparent to a user to facilitate augmented reality or mixed reality and to enable a user to view scene light from the environment around her while also receiving image light directed to her eye(s). Consequently, lens assembly 108 may be considered (or include) an optical combiner. Lens assembly 108 may include two or more optical layers that carry portions of waveguide system 102, in an embodiment. In some embodiments, display light from one or more integrated displays is directed into one or both eyes of the wearer of HMD 100.

Waveguide system 102 and image sensor 104 can be configured to capture images of reflections off of a user's eye, according to an embodiment. To generate reflections of light off of the user's eye, HMD 100 may include a number of light sources 112 positioned at one or more locations around frame 106. Light sources 112 are oriented to direct light towards the eyebox region, to illuminate at least one user's eyes. Light sources 112 may emit light that is in the non-visible spectrum. For example, light sources 112 are configured to emit infrared light, for example, having a wavelength in the range of 750 nm to 1500 nm, according to an embodiment. Some of light sources 112 may be configured to emit first-wavelength light that is light having a first wavelength (e.g., 1300 nm), and others of light sources 112 may be configured to emit second-wavelength light that is light of a second wavelength (e.g., 940 nm). Light sources 112 may be light emitting diodes (LEDs), vertical-cavity surface-emitting lasers (VCSELs), micro light emitting diode (micro-LED), an edge emitting LED, a superluminescent diode (SLED), or another type of light source. In one embodiment, light emitted from some of light sources 112 is infrared light centered around 850 nm. Infrared light from other sources may illuminate the eye as well. HMD 100 may be configured to use images of reflections off of a user's eyes to determine an orientation of a user's eye and/or to perform eye tracking operations, according to an embodiment.

HMD 100 includes a controller 118 communicatively coupled to image sensor 104, according to an embodiment. Controller 118 is coupled to image sensor 104 to receive images captured by image sensor 104 using waveguide system 102, according to an embodiment. Controller 118 may include processing logic 120 and one or more memories 122 to analyze image data received from image sensor 104, to determine an orientation of one or more of a user's eyes, to perform one or more eye tracking operations, and/or to display or provide user interface elements in lens assembly 108, according to an embodiment. Controller 118 may include a wired and/or wireless data interface for sending and receiving data and graphic processors, and one or more memories 122 for storing data and computer-executable instructions. Controller 118 and/or processing logic 120 may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

HMD 100 may include a waveguide system 114 and an image sensor 116 positioned on or around a lens assembly 124 that is on, for example, a left side of frame 106. Waveguide system 114 may include similar features as waveguide system 102, according to an embodiment. Image sensor 116 may be configured to operate similarly to image sensor 104 and may also be coupled to controller 118, according to an embodiment. Lens assembly 124 may include similar features and/or layers as lens assembly 108.

Waveguide system 102 may be configured to pass or transmit scene light from a scene side of HMD 100 so that waveguide system 102 appears to be transparent to a user of HMD 100. Waveguide system 102 is also configured to selectively direct light from, for example, a center region 126 of lens assembly 108 to image sensor 104, according to various aspects of the disclosure.

Figure 2:
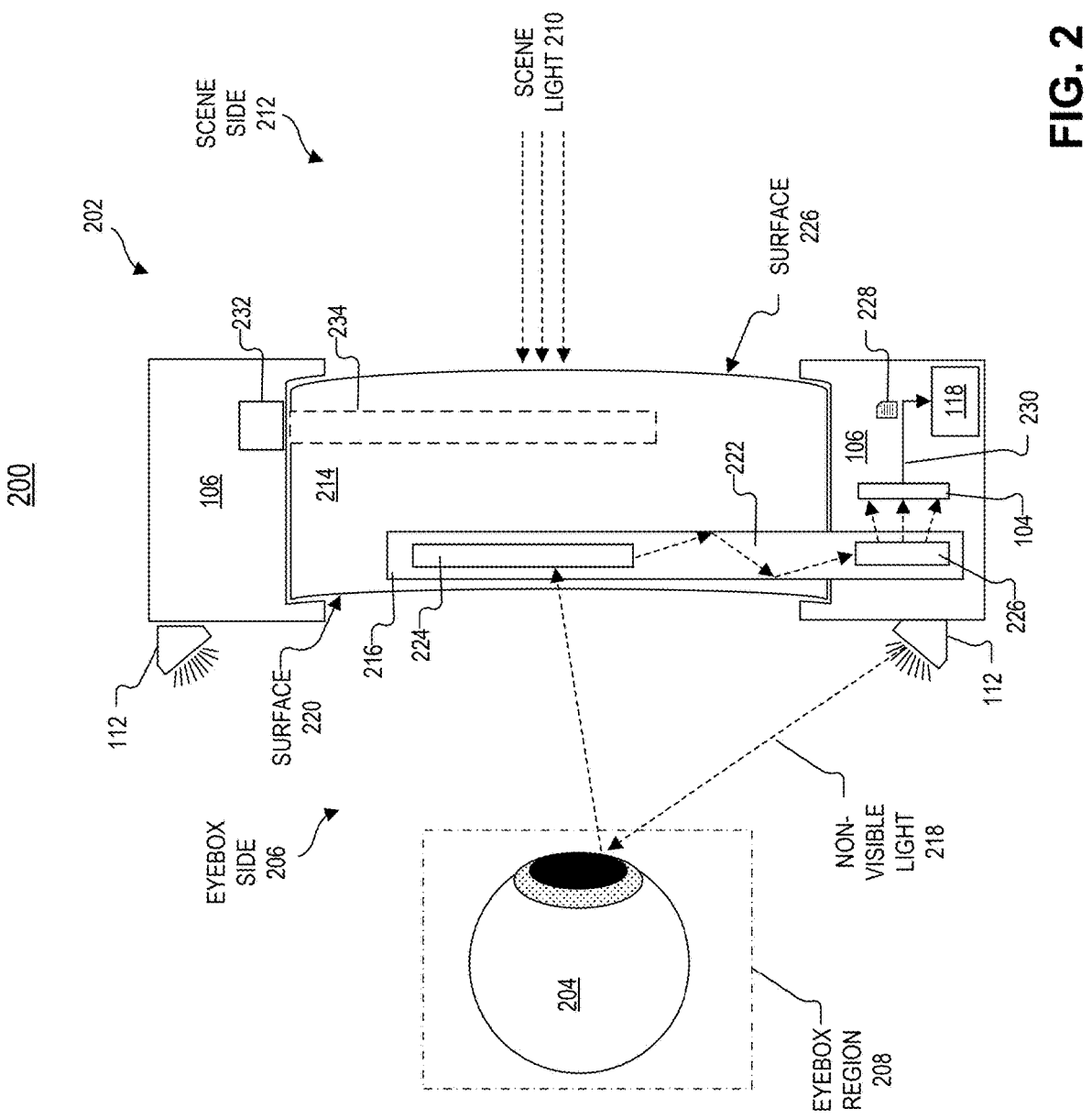
FIG. 2 illustrates an example implementation of a lens assembly for a head mounted display, in accordance with aspects of the disclosure.

FIG. 2 illustrates an example top view of an ocular environment 200, in accordance with various embodiments of the disclosure. Ocular environment 200 includes an HMD 202 and an eye 204, according to an embodiment. HMD 202 is an example implementation of HMD 100. As illustrated, HMD 202 is a partial cross-sectional view of aspects of a head mounted display, according to an embodiment. Eye 204 is positioned on an eyebox side 206 of HMD 202. Eye 204 is positioned in an eyebox region 208 on eyebox side 206 and is positioned to receive scene light 210 from a scene side 212. Scene light 210 passes through a lens assembly 214 to eyebox region 208 and to eye 204, according to an embodiment. Scene light 210 passes from scene side 212 through lens assembly 214 and through waveguide system 216 to eyebox side 206.

Waveguide system 216 is an example implementation of waveguide system 102 and/or 114, according to an embodiment. Waveguide system 216 is configured to receive reflections of non-visible light 218 that becomes incident on surface 220 from eye 204 and/or eyebox region 208, according to an embodiment. Waveguide system 216 includes a waveguide 222, an in-coupling diffraction grating 224, and an out-coupling diffraction grating 226, according to an embodiment.

Waveguide system 216 is configured to receive reflections of non-visible light 218 with in-coupling diffraction grating 224, according to an embodiment. In-coupling diffraction grating 224 in-couples reflected light into waveguide 222, according to an embodiment. In-coupling diffraction grating 224 may represent two, three, or more in-coupling diffraction gratings (e.g., a first diffraction grating configured to diffract light in a first direction and a second diffraction grating configured to diffraction light in a second direction). By in-coupling the reflected light into waveguide 222, in-coupling diffraction grating 224 directs the reflected light to out-coupling diffraction grating 226, according to an embodiment. Out-coupling diffraction grating 226 receives the reflected light from in-coupling diffraction grating 224, after the reflected light has propagated from in-coupling diffraction grating 224 to out-coupling diffraction grating 226 through total internal reflection (TIR) within waveguide 222, according to an embodiment.

Out-coupling diffraction grating 226 is configured to receive the reflected light and out-couple the reflected light from waveguide 222, according to an embodiment. Out-coupling diffraction grating 226 is configured to provide the received reflected light to image sensor 104, according to an embodiment. As illustrated, out-coupling diffraction grating 226 and image sensor 104 may be positioned within (or on) a portion of frame 106 (e.g., out of the field-of-view of eye 204), according to an embodiment. Out-coupling diffraction grating 226 and a portion of waveguide 222 may be positioned within a portion of frame 106, to facilitate out-coupling of the reflected light from out-coupling diffraction grating 226 to image sensor 104, according to an embodiment. Out-coupling diffraction grating 226 may be implemented as two or more out-coupling diffraction gratings that are configured to direct light to two or more respective image sensors, according to an embodiment.

Image sensor 104 is configured to convert the received reflected light into electrical signals. The electrical signals may be representative of the reflected light received by in-coupling diffraction grating 224, according to an embodiment. Image sensor 104 converts the received reflected light into image data 228 and provides image data 228 to controller 118 through a communications channel 230, according to an embodiment. In other words, controller 118 may be communicatively coupled to receive image data 228 from image sensor 104. Controller 118 may employ one or more of a variety of techniques to determine an orientation of eye 204 and perform one or more eye tracking operations based on image data 228, according to an embodiment.

HMD 202 may include a projector 232 and a display 234 that are configured to provide information and/or user interface elements to eyebox region 208 for viewing by a user of HMD 202, according to an embodiment. Display 234 may include a liquid crystal display (LCD), an organic light emitting diode (OLED) display, micro-LED display, quantum dot display, pico-projector, or liquid crystal on silicon (LCOS) display for directing image light to a wearer of HMD 202. Projector 232 may be positioned in or on frame 106, and display 234 may be at least partially positioned within lens assembly 214, according to an embodiment. Display 234 may be transparent and may be configured to allow scene light 210 to pass through lens assembly 214 to eyebox region 208, according to an embodiment. Projector 232 and display 234 may be communicatively coupled to receive instructions and/or information from controller 118 and may be configured to project information at least partially based on an orientation of eye 204, according to an embodiment.

Lens assembly 214 is illustrated as a single optical layer for illustrative purposes. Lens assembly 214 may be implemented as a single optical layer, as illustrated, or may be implemented as two or more optical layers coupled together to include waveguide system 216 and display 234, according to an embodiment.

Figure 3:
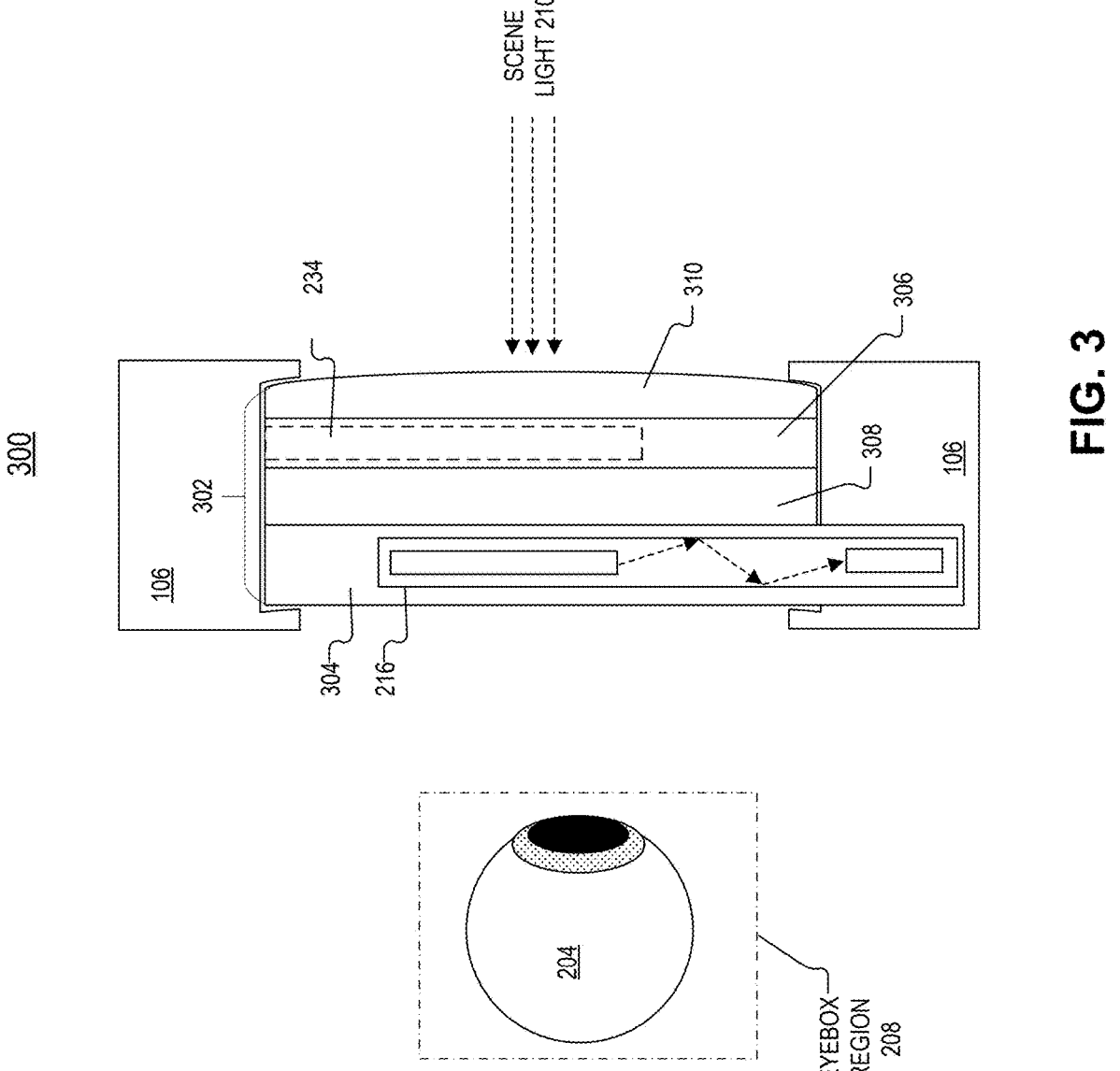
FIG. 3 illustrates an example implementation of a lens assembly, in accordance with aspects of the disclosure.

FIG. 3 illustrates a top view of an HMD 300, according to an embodiment. HMD 300 includes a lens assembly 302 that includes a number of optical layers, according to an embodiment. Lens assembly 302 is an example implementation of lens assembly 214, according to an embodiment. Lens assembly 302 includes a waveguide optical layer 304 and a display optical layer 306, according to an embodiment. Waveguide optical layer 304 is coupled to display optical layer 306 to transmit scene light 210 to eyebox region 208, according to an embodiment. Lens assembly 302 may include one or more additional layers, such as optical layer 308 and optical layer 310 to provide optical power, spacing, and one or more additional features or characteristics to support operation of HMD 300, according to an embodiment.

Figure 4A:
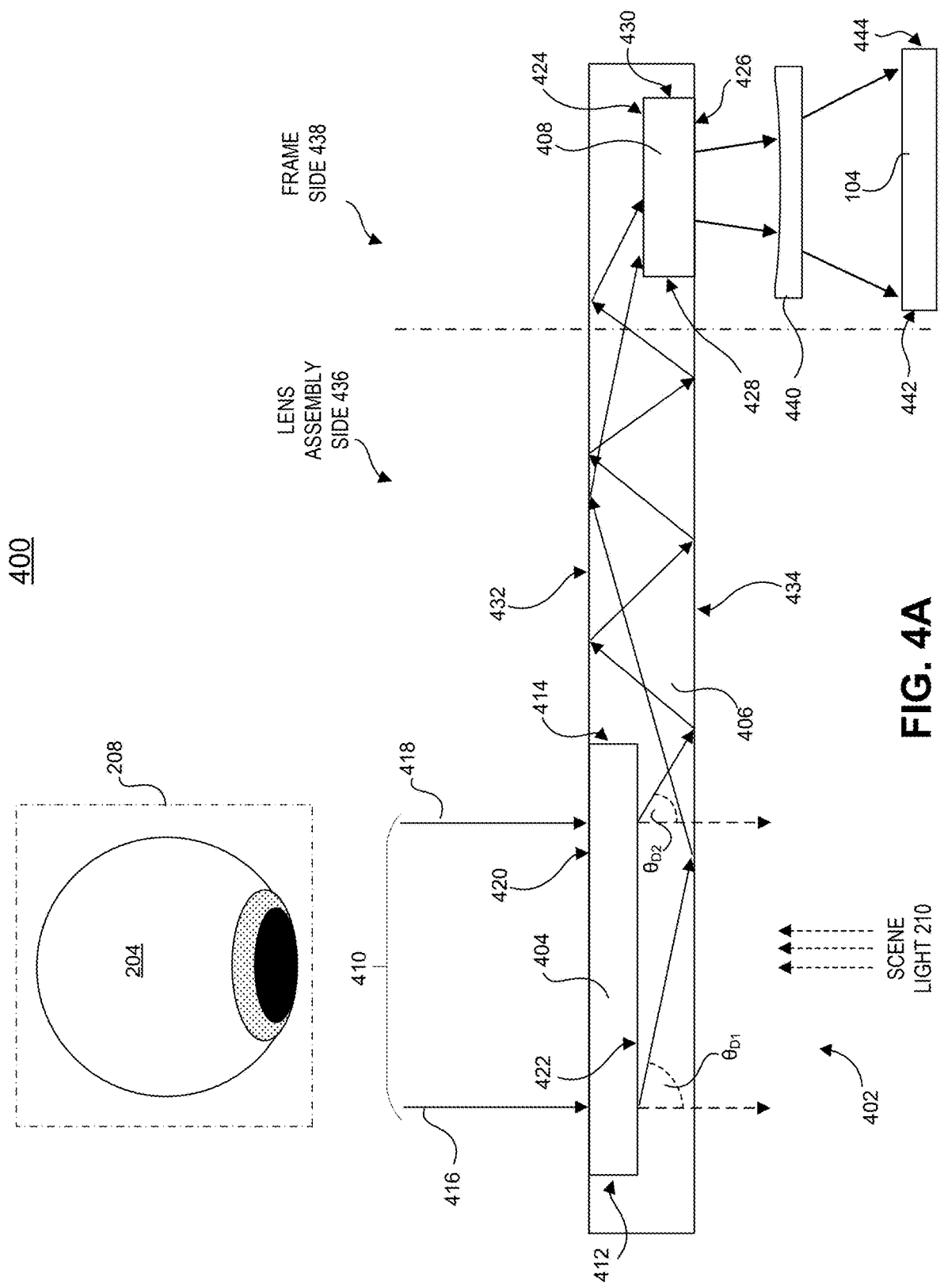
FIGS. 4A and 4B illustrate example implementations of a waveguide system that may be used in an HMD to support eye tracking operations, in accordance with aspects of the disclosure.
Figure 4B:
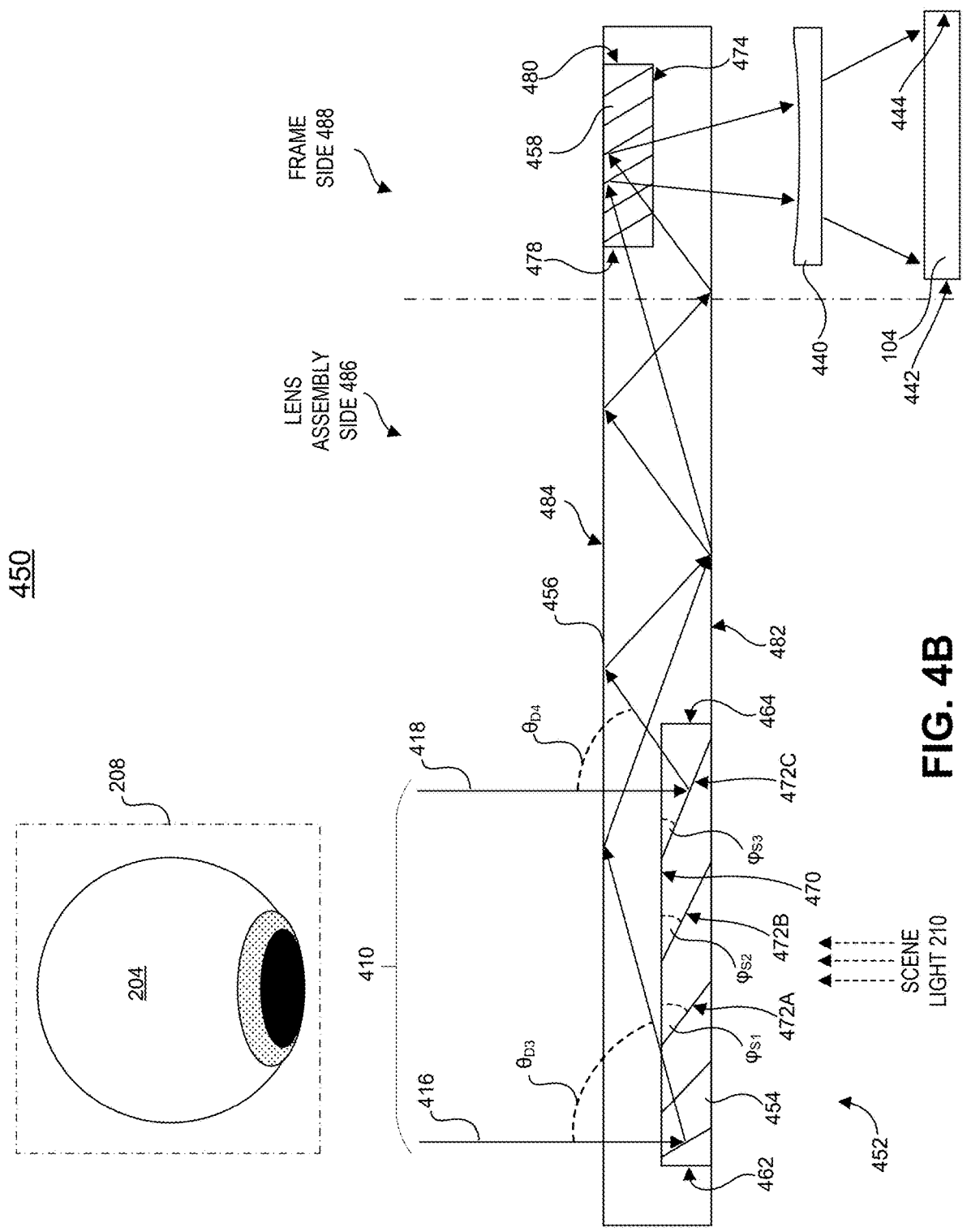

FIGS. 4A and 4B illustrate example embodiments of a waveguide imaging system that may be implemented into one or more of the disclosed HMDs, in accordance with aspects of the disclosure.

FIG. 4A illustrates a waveguide imaging system 400, according to an embodiment. Waveguide imaging system 400 includes a waveguide system 402 that is configured to receive light (e.g., reflected infrared light) from eyebox region 208 and provide the light to image sensor 104, according to an embodiment. Waveguide system 402 is an example implementation of waveguide system 102 (shown in FIG. 1) and/or waveguide system 216 (shown in FIG. 2). Waveguide system 402 uses a diffraction grating 404 to in-couple light into a waveguide 406 and uses a diffraction grating 408 to out-couple light from waveguide 406 to image sensor 104, according to an embodiment. Diffraction grating 404, waveguide 406, and diffraction grating 408 are optical elements that at least partially define waveguide system 402 and that operate together to direct light from eyebox region 208 to image sensor 104, according to an embodiment.

Diffraction grating 404 is a transmissive optical grating that is configured to operate in transmission to diffract some wavelengths of light while passing (without diffraction) other wavelengths of light. Diffraction grating 404 may be configured to diffract light having a wavelength in the infrared range of wavelengths while passing other wavelengths of light (e.g., the visible band of wavelengths) without diffraction. Diffraction grating 404 in-couples light 410 from eyebox region 208 (e.g., from eye 204) into waveguide 406 so that waveguide 406 reflects (e.g., with TIR) light 410 to diffraction grating 408.

Diffraction grating 404 includes a first end 412 and a second end 414 and is configured to diffract light rays from first end 412 differently than from second end 414, according to an embodiment. For example, diffraction grating 404 may be configured to diffract light rays 416 on first end 412 with a first diffraction angle $\theta_{D1}$ and may be configured to diffract light rays 418 on second end 414 with a second diffraction angle $\theta_{D2}$. In one embodiment, first diffraction angle $\theta_{D1}$ is a greater angle than second diffraction angle $\theta_{D2}$ so that diffraction grating 404 diffracts light 410 more aggressively from first end 412 and diffracts light 410 less aggressively from second end 414 to reduce the likelihood that light rays reflected within waveguide 406 are reflected back onto diffraction grating 404. Diffraction grating 404 is configured to diffract light at diffraction angles that progressively become smaller from first end 412 to second end 414, according to an embodiment. Alternatively, diffraction grating 404 is configured to diffract light at diffraction angles that progressively become larger from first end 412 to second end 414, according to an embodiment. Light rays 416 and 418 are representative of a large number of light rays (e.g., light 410) that are received by an entrance surface 420 and that are diffracted out of an exit surface 422 at diffraction angles that change from first end 412 to second end 414, according to various aspects of the disclosure.

Diffraction grating 408 is configured to receive light rays 416 and 418 with an entrance surface 424 and is configured to direct light rays 416 and 418 to image sensor 104. Diffraction grating 408 is a transmissive grating that is configured to operate in transmission to diffract some wavelengths of light while passing other wavelengths of light. Diffraction grating 408 is a transmissive diffraction grating that out-couples light rays 416 and 418 from waveguide 406 to image sensor 104, according to an embodiment. Diffraction grating 408 may be configured to diffractively out-couple light rays 416 and 418 from waveguide 406 to image sensor 104, according to an embodiment. Similar to diffraction grating 404, diffraction grating 408 may be configured to diffract light from exit surface 426 at a different angle from a first side 428 than from a second side 430. Diffraction grating 408 may be configured to diffract light from first side 428 at a smaller diffraction angle than from second side 430. Diffraction grating 408 may be configured to emit light at diffraction angles that gradually or progressively change from first side 428 to second side 430. The diffraction angles of emitted light rays from exit surface 426 progressively increase from first side 428 to second side 430, according to an embodiment. The diffraction angles of emitted light rays from exit surface 426 progressively decrease from first side 428 to second side 430, according to an embodiment.

Diffraction grating 404 is positioned within waveguide 406 near a surface 432 of waveguide 406 to enable diffraction grating 404 to in-couple light 410 into waveguide 406 and to enable diffraction grating 404 to direct light 410 towards diffraction grating 408, according to an embodiment. Entrance surface 420 of diffraction grating 404 defines or makes up at least part of surface 432 of waveguide 406, so that part of entrance surface 420 and surface 432 are the same surface, according to an embodiment. Diffraction grating 404 is positioned in waveguide 406 on a lens assembly side 436 of waveguide 406, according to an embodiment. Lens assembly side 436 of waveguide 406 represents a portion of waveguide 406 that transmits scene light 210 to eyebox region 208, according to an embodiment.

Diffraction grating 408 is positioned within waveguide 406 near a surface 434 of waveguide 406 to enable diffraction grating 408 to out-couple light 410 out of waveguide 406 and to enable diffraction grating 408 to direct light 410 towards image sensor 104, according to an embodiment. Exit surface 426 of diffraction grating 408 defines or makes up at least part of surface 434 of waveguide 406, so that part of exit surface 426 and surface 434 are the same surface, according to an embodiment. Diffraction grating 408 is positioned in waveguide 406 on a frame side 438 of waveguide 406, according to an embodiment. Frame side 438 of waveguide 406 represents a portion of waveguide 406 that is at least partially positioned within or on a surface of a frame of an HMD to enable out-coupling of light to image sensor 104, according to an embodiment.

Waveguide imaging system 400 may optionally include a lens 440 that is positioned between waveguide 406 and image sensor 104. Lens 440 may be constructed from a single optical layer or may include a number of optical layers coupled together to focus light from exit surface 426 onto image sensor 104. In one embodiment, diffraction grating 408 and lens 440 are configured to focus light from first end 412 of diffraction grating 404 onto a first end 442 of image sensor 104 and are configured to focus light from second end 414 of diffraction grating 404 onto a second end 444 of image sensor 104, or vice versa.

FIG. 4B illustrates a waveguide imaging system 450, according to an embodiment. Waveguide imaging system 450 includes a waveguide system 452 that is configured to receive light 410 from eyebox region 208 and selectively provide light 410 to image sensor 104, according to an embodiment. Waveguide system 452 is an example implementation of waveguide system 102 (shown in FIG. 1) and/or waveguide system 216 (shown in FIG. 2). Waveguide system 452 employs one or more reflective volume Bragg gratings (VBG) to couple light 410 to image sensor 104, according to an embodiment. By using VBGs, waveguide system 452 may advantageously operate with a reduction or elimination (e.g., below 0.01%) of visible rainbow artifacts that may occur in in-field waveguide imaging systems. More specifically, waveguide system 452 may operate with transmissive rainbow artifacts that are below 0.01% and may operate with virtually non-existent reflective rainbow artifacts, according to some implementations. In an embodiment, waveguide system 452 uses a reflective diffraction grating 454 to in-couple light into a waveguide 456 and uses a reflective diffraction grating 458 to out-couple light from waveguide 456 to image sensor 104, according to an embodiment.

Diffraction grating 454 is a reflective diffraction grating (e.g., a reflective VBG) that is configured to operate in reflection to diffract some wavelengths of light while passing (not operating on) other wavelengths of light. Diffraction grating 454 may be configured to diffract light having a wavelength (e.g., 850 nm) in the infrared range of wavelengths while passing other wavelengths of light (e.g., the visible band of wavelengths) without diffraction. Diffraction grating 454 in-couples light 410 from eyebox region 208 (e.g., from eye 204) into waveguide 456 so that waveguide 456 reflects (e.g., with TIR) light 410 to diffraction grating 458.

Diffraction grating 454 includes a first end 462 and a second end 464 and is configured to diffract light rays from first end 462 differently than light rays from second end 464, according to an embodiment. For example, diffraction grating 454 may be configured to diffract light rays 416 on first end 462 with a first diffraction angle $\theta_{D3}$ and may be configured to diffract light rays 418 on second end 464 with a second diffraction angle $\theta_{D4}$. In one embodiment, first diffraction angle $\theta_{D3}$ is a greater angle than second diffraction angle $\theta_{D4}$ so that diffraction grating 454 diffracts light 410 more aggressively from first end 462 and diffracts light 410 less aggressively from second end 464 to reduce the likelihood that light rays are reflected back onto diffraction grating 454. Diffraction grating 454 is configured to diffract light at diffraction angles that progressively become smaller from first end 462 to second end 464, according to an embodiment. Diffraction grating 454 is configured to diffract light at diffraction angles that progressively become larger from first end 462 to second end 464, according to an embodiment. Light rays 416 and 418 are representative of a large number of light rays (e.g., light 410) that are received by a surface 470 and that are diffracted back out of surface 470 at diffraction angles that change from first end 462 to second end 464, according to various aspects of the disclosure.

Diffraction grating 454 is a rolled diffraction grating having a number of slanted grating planes 472 that change (e.g., progressively increase or decrease) the diffraction angle of exiting light rays from first end 462 to second end 464 of diffraction grating 454. Slanted grating planes 472 change the diffraction angle of exiting light rays based on the slant angles of slanted grating planes 472. Diffraction grating 454 maps each position of incident light rays to one or more particular total internal reflection (TIR) angles inside waveguide 456, according to an embodiment. In other words, diffraction grating 454 encodes information onto received light rays by associating a light ray's incident position (on diffraction grating 454) with a TIR angle within waveguide 456, according to an embodiment. The particular TIR angle by which a light ray is received by diffraction grating 458 provides an indication of the light ray's incident position onto diffraction grating 454 (e.g., from eyebox region 208), according to an embodiment. Diffraction grating 458 is configured to decode the light ray's incident position based on the light ray's particular diffraction angle, according to an embodiment. The particular angle by which a light ray exits waveguide 456 and/or is received by image sensor 104 provides an indication of the light ray's incident position and/or angle of incidence onto diffraction grating 454, according to an embodiment.

Slanted grating planes 472 (individually, slanted grating plane 472A, 472B, 472C, etc.) are associated with slant angles q (individually, slant angle $\varphi_{S1}$, $\varphi_{S2}$, $\varphi_{S3}$) that at least partially define the angle of slanted grating planes 472. For clarity in the illustration, only a limited number of the illustrated slanted grating planes are labeled. However, in practice the number of grating planes having, for example, a few microns of spacing between each other would be difficult to fully illustrate. Slant angles $\varphi$ are defined with respect to surface 470 of diffraction grating 454, according to an embodiment. Slant angles $\varphi$ may also be defined with respect to the intersection of surface 470 and the normal to each of slanted grating planes 472, according to an embodiment. Slant angles φ and slanted grating planes 472 are at least partially defined by the techniques described in association with FIG. 5, FIG. 6, and FIG. 7, according to embodiments of the disclosure.

Diffraction grating 458 is configured to receive light rays 416 and 418 (e.g., with a surface 474) and is configured to direct light rays 416 and 418 to image sensor 104. Diffraction grating 458 is a reflective diffraction grating that is configured to operate in reflection to diffract some wavelengths of light (e.g., within the infrared wavelengths) while passing other wavelengths of light (e.g., visible wavelengths). Diffraction grating 458 is a reflective diffraction grating that out-couples light rays 416 and 418 from waveguide 456 to image sensor 104, according to an embodiment. Similar to diffraction grating 454, diffraction grating 458 may be configured to diffract light from surface 474 at a different angle from a first side 478 than from a second side 480. Diffraction grating 458 may be configured to diffract light from first side 478 at a smaller diffraction angle than from second side 480. Diffraction grating 458 may be configured to emit light at diffraction angles that gradually or progressively change from first side 478 to second side 480. The diffraction angles of light rays emitted from surface 474 progressively increase from first side 478 to second side 480, according to an embodiment. The diffraction angles of light rays emitted from surface 474 progressively decreases from first side 478 to second side 480, according to an embodiment.

Diffraction grating 454 is positioned within waveguide 456 near a surface 482 of waveguide 456 to enable diffraction grating 454 to in-couple light 410 into waveguide 456 and to enable diffraction grating 454 to direct light 410 towards diffraction grating 458, according to an embodiment. At least one surface of diffraction grating 454 and surface 482 are on the same plane or at least partially define the same surface, according to an embodiment. Diffraction grating 454 is positioned in waveguide 456 on a lens assembly side 486 of waveguide 456, according to an embodiment. Lens assembly side 486 of waveguide 456 represents a portion of waveguide 456 that transmits scene light 210 to eyebox region 208, according to an embodiment.

Diffraction grating 458 is positioned within waveguide 456 near a surface 484 of waveguide 456 to enable diffraction grating 458 to out-couple light 410 out of waveguide 456 and to enable diffraction grating 458 to direct light 410 towards image sensor 104, according to an embodiment. At least one surface of diffraction grating 458 and surface 484 are on the same plane or at least partially define the same surface, according to an embodiment. Diffraction grating 458 is positioned in waveguide 456 on a frame side 488 of waveguide 456, according to an embodiment. Frame side 488 of waveguide 456 represents a portion of waveguide 456 that is at least partially positioned within or on a surface of a frame of an HMD to enable out-coupling of light to image sensor 104, according to an embodiment.

Waveguide imaging system 450 may optionally include lens 440 that is positioned between waveguide system 452 and image sensor 104. Lens 440 may be constructed from a single optical layer or may include a number of optical layers coupled together to focus light from diffraction grating 458 onto image sensor 104. In one embodiment, diffraction grating 458 and lens 440 are configured to focus light from first end 462 of diffraction grating 454 onto first end 442 of image sensor 104 and are configured to focus light from second end 464 of diffraction grating 454 onto second end 444 of image sensor 104.

Figure 5:
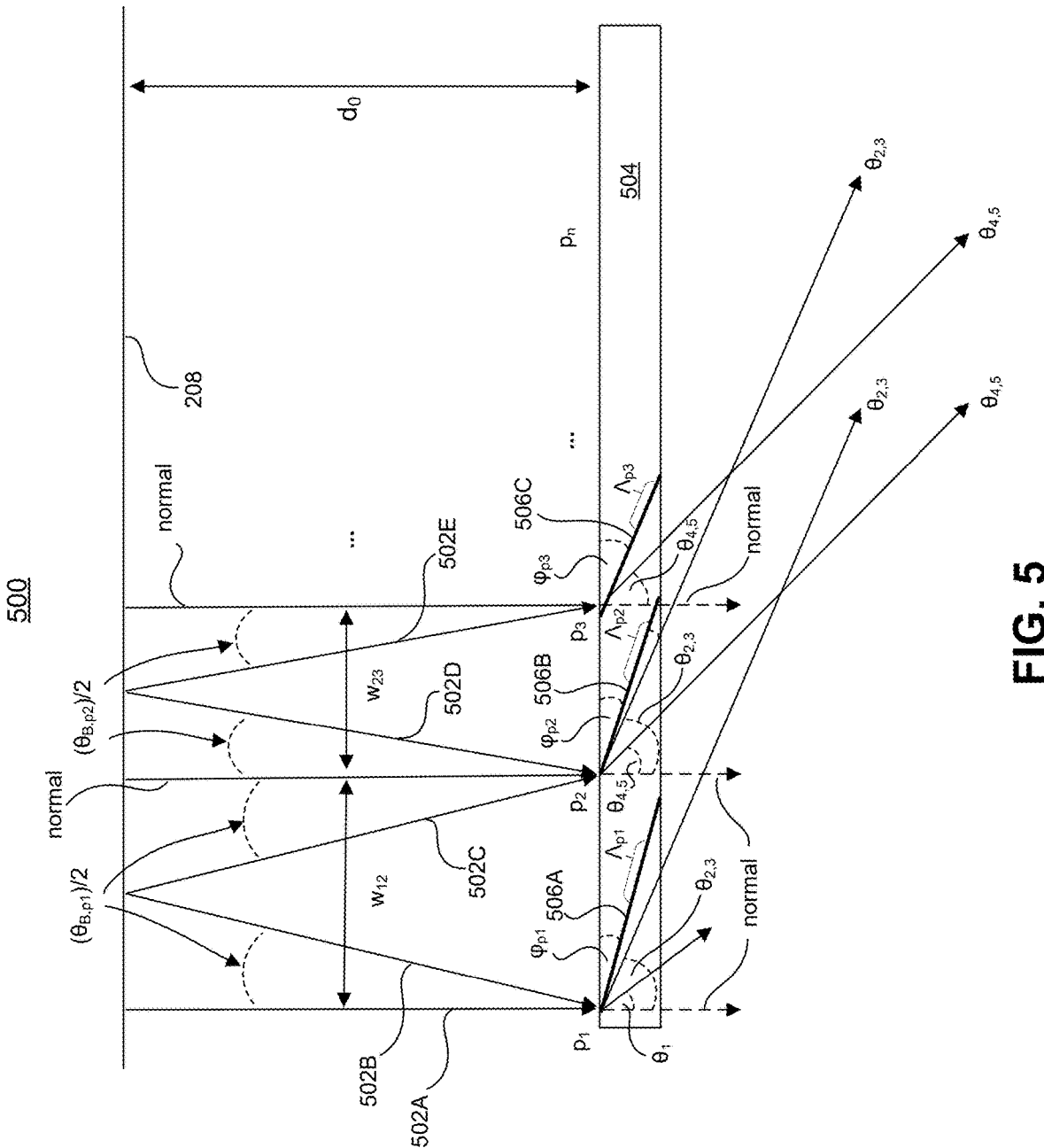
FIG. 5 illustrates a diagram that shows techniques for defining characteristics of a rolled diffraction grating, in accordance with aspects of the disclosure.

FIG. 5 illustrates a diagram 500 for defining and constructing one or more characteristics of waveguide systems 402 and/or 452, in accordance with embodiments of the disclosure. Diagram 500 illustrates light rays 502 (individually, light ray 502A, 502B, 502C, 502D, 502E) incident upon an optical element 504 at a variety of positions p (individually, position $p_1$, $p_2$, $p_3$, $p_n$) to determine diffraction angles, grating periods, and slant angles of slanted grating planes 506 (individually, slanted grating plane 506A, 506B, 506C), in accordance with aspects of the disclosure. Optical element 504 may be a transmissive or reflective diffraction grating (e.g., a holographic optical element), according to various aspects of the disclosure.

To define a first slant angle $\varphi_{p1}$ at a first point $p_1$, a diffraction angle $\theta_1$ is defined to be 80° for a first light ray 502A. First light ray 502A originates from eyebox region 208 that is a distance do from optical element 504. First ray 502A has an incident angle of 0°. First slant angle $\varphi_{p1}$ of a first slanted grating plane 506A may be adjusted until diffraction angle $\theta_1$ for first light ray 502A is 80°. A grating period $\Lambda_{p1}$ is a transversal distance between adjacent grating lines on slanted grating planes 506 and is based on the wavelength of light being selectively diffracted (e.g., 850 nm). Grating period $\Lambda_{p1}$ and slant angle $\varphi_{p1}$ are adjusted at $p_1$ until diffraction angle $\theta_1$ is 80° for first light ray 502A. Diffraction angle $\theta_1$ may be measured from a normal to a surface (e.g., exit surface) of optical element 504.

Once the grating period $\Lambda_{p1}$ and slant angle $\varphi_{p1}$ for first slanted grating plane 506A have been determined at first point $p_1$ to achieve a particular diffraction angle, an angular bandwidth $\theta_{B,p1}$ at first point $p_1$ is determined. As an example, angular bandwidth $\theta_{B,p1}$ may be determined by directing various light rays at first point $p_1$ with different incident angles until the angle of diffraction exceeds a predetermined threshold.

Having determined angular bandwidth $\theta_{B,p1}$, a second light ray 502B is emitted or directed to first point $p_1$ at an incident angle of $-\theta_{B,p1}/2$ (negative theta divided by 2). An angle $\theta_{2,3}$ is the resulting diffraction angle from first point $p_1$ of second light ray 502B. Angle $\theta_{2,3}$ may be measured from a normal to a surface (e.g., exit surface) of optical element 504.

At a second point $p_2$, a grating period $\Lambda_{p2}$ and a slant angle $\varphi_{p2}$ of a second slanted grating plane 506B are adjusted to so that a third light ray 502C also diffracts at diffraction angle $\theta_{2,3}$. Third light ray 502C is emitted or directed to second point $p_2$ with an incident angle of $\theta_{B,p1}/2$ (positive theta divided by 2). Second point $p_2$ is determined as a distance $w_{12}$ from first point $p_1$ along the surface of optical element 504, according to an embodiment. Distance $w_{12}$ may be defined in accordance with Equation 1, which is:

$$w_{12} = 2 * d_0 * \tan(\theta_{B,p1}/2).$$

To determine a grating period $\Lambda_{p3}$ and a slant angle $\varphi_{p3}$ at a third point $p_3$, a diffraction angle $\theta_{4,5}$ is determined from second point $p_2$. Diffraction angle $\theta_{4,5}$ may be determined based on an angular bandwidth $\theta_{B,p2}/2$ of second point p2. Angular bandwidth $\theta_{B,p2}$ may be determined by directing various light rays at second slanted grating plane 506B at second point $p_2$ from various incident angles until the angle of diffraction exceeds a predetermined threshold. Fourth light ray 502D is emitted or directed towards second point p2 at an incident angle $-\theta_{B,p2}/2$ (negative theta divided by 2), and the resulting diffraction angle of fourth light ray 502D is diffraction angle $\theta_{4,5}$. Angle $\theta_{4,5}$ may be measured from a normal to a surface (e.g., exit surface) of optical element 504.

Grating period $\Lambda_{p3}$ and slant angle $\varphi_{p3}$ of a third slanted grating plane 506C are determined at third point p3, at least partially based on diffraction angle $\theta_{4,5}$. Third point $p_3$ is determined as a distance $w_{23}$ from second point $p_2$ along the surface of optical element 504, according to an embodiment. Distance $w_{23}$ may be defined in accordance with Equation 2, which is:

$$w_{23}=2*d_0*\tan(\theta_{B,p2}/2).$$

Values for grating period $\Lambda_{p3}$ and slant angle $\varphi_{p3}$ are determined by adjusting grating period $\Lambda_{p3}$ and slant angle $\varphi_{p3}$ until a fifth light ray 502E diffracts from slanted grating plane 506C at diffraction angle $\theta_{4,5}$. Fifth light ray 502E is emitted or directed towards third point $p_3$ at an incident angle of $\theta_{B,p2}/2$ (theta divided by 2) while adjusting grating period $\Lambda_{p3}$ and slant angle $\varphi_{p3}$ according to an embodiment.

The general sequence discussed for determining characteristics of slanted grating planes 506 may be repeatedly applied for the entire length of optical element 504 to generate an optical element with slanted grating planes that operate to diffract light in accordance with the diffraction gratings described herein (e.g., diffraction grating 404, 454), in accordance with embodiments of the disclosure. This sequence may be repeated until a critical diffraction angle is reached where diffracted light rays from slanted grating planes no longer experience TIR within the waveguide.

In some embodiments, the process of identifying and defining characteristics of optical element 504 is performed by one or more processors configured to operate fabrication or manufacturing equipment used to, for example, record and/or test optical elements, diffraction gratings, waveguide systems, waveguide imaging systems, and/or HMDs, according to various embodiments.

FIG. 6 illustrates a diagram 600 that shows optical characteristics of waveguide systems and diffraction gratings, according to aspects of the disclosure. Diagram 600 includes a top view of a waveguide system 602 that at least partially operates with rotation angles illustrated in chart 604, according to an embodiment. Waveguide system 602 includes a waveguide 606, an in-coupling diffraction grating 608, and an out-coupling diffraction grating 610, according to an embodiment. Waveguide system 602 is an example of a top view of waveguide systems 102, 216, 402, and/or 452, according to an embodiment. In-coupling diffraction grating 608 is an example top view of diffraction grating 404 and/or 454, according to an embodiment. Out-coupling diffraction grating 610 is an example top view of diffraction grating 408 and/or 458, according to an embodiment.

In-coupling diffraction grating 608 includes slanted grating planes 612 that are arcuately and concavely curved with respect to the direction of out-coupling diffraction grating 610, according to an embodiment. The curvature of slanted grating planes 612 directs light rays 614 (at various angles) towards out-coupling diffraction grating 610 and enables out-coupling diffraction grating 610 to have a smaller receiving surface area than the emitting surface area of in-coupling diffraction grating 608, according to an embodiment. The smaller surface area of out-coupling diffraction grating 610 enables easier concealment and placement of out-coupling diffraction grating 610 within or on a frame of an HMD, according to an embodiment. The larger surface area of in-coupling diffraction grating 608 may enable reception and in-coupling of more light from an eyebox region of an HMD or from a user's eye for an HMD. Chart 604 show how many degrees of rotation a light ray (e.g., light ray 614) experiences based on the positive and negative displacement of the light ray along the x-axis and y-axis of in-coupling diffraction grating 608, according to one embodiment.

FIG. 7 illustrates a process 700 for fabricating a rolled diffraction grating, according to an embodiment. Process 700 may be incorporated into one or more fabrication systems including one or more processors and one or more laser controllers configured to record diffraction patterns in a recording medium to create, for example, a volume grating, according to an embodiment. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

At process block 702, process 700 determines an operating distance to an optical element, according to an embodiment. The operating distance may be a distance between the optical element and an eyebox region or eye of a user. The optical element may be a recording medium from which a holographic optical element may be fabricated. Process block 702 may proceed to process block 704, according to an embodiment.

At process block 704, process 700 provides an initial light ray having an initial incident angle to an initial point on the optical element, according to an embodiment. The initial incident angle may be 0°. Process block 704 may proceed to process block 706, according to an embodiment.

At process block 706, process 700 adjusts an initial grating period and/or slant angle of an initial slanted grating plane at the initial point until an initial diffraction angle for the initial light ray achieves an initial threshold, according to an embodiment. The initial threshold may be a predetermined threshold, such as 80°. Process block 706 may proceed to process block 708, according to an embodiment.

At process block 708, process 700 determines an angular bandwidth of the slanted grating plane, according to an embodiment. Process block 708 proceeds to process block 710, according to an embodiment.

At process block 710, process 700 provides a next light ray at the point with an incident angle of −½ the angular bandwidth and determines a next diffraction angle of the next light ray, according to an embodiment. Process block 710 proceeds to process block 712, according to an embodiment.

At process block 712, process 700 moves to a next point on the optical element, according to an embodiment. Process block 712 proceeds to process block 714, according to an embodiment.

At process block 714, process 700 provides a next light ray at the next point with an incident angle of +½ the angular bandwidth, according to an embodiment. Process block 714 proceeds to process block 716, according to an embodiment.

At process block 716, process 700 adjusts a next grating period and/or next slant angle of a next slanted grating plane around the next point until the next light ray diffracts from the next slanted grating plane at the next diffraction angle determined at process block 710, according to an embodiment. Process block 716 proceeds to process block 708, until the next diffraction angle meets or exceeds a critical angle threshold, according to an embodiment.

Figure 8:
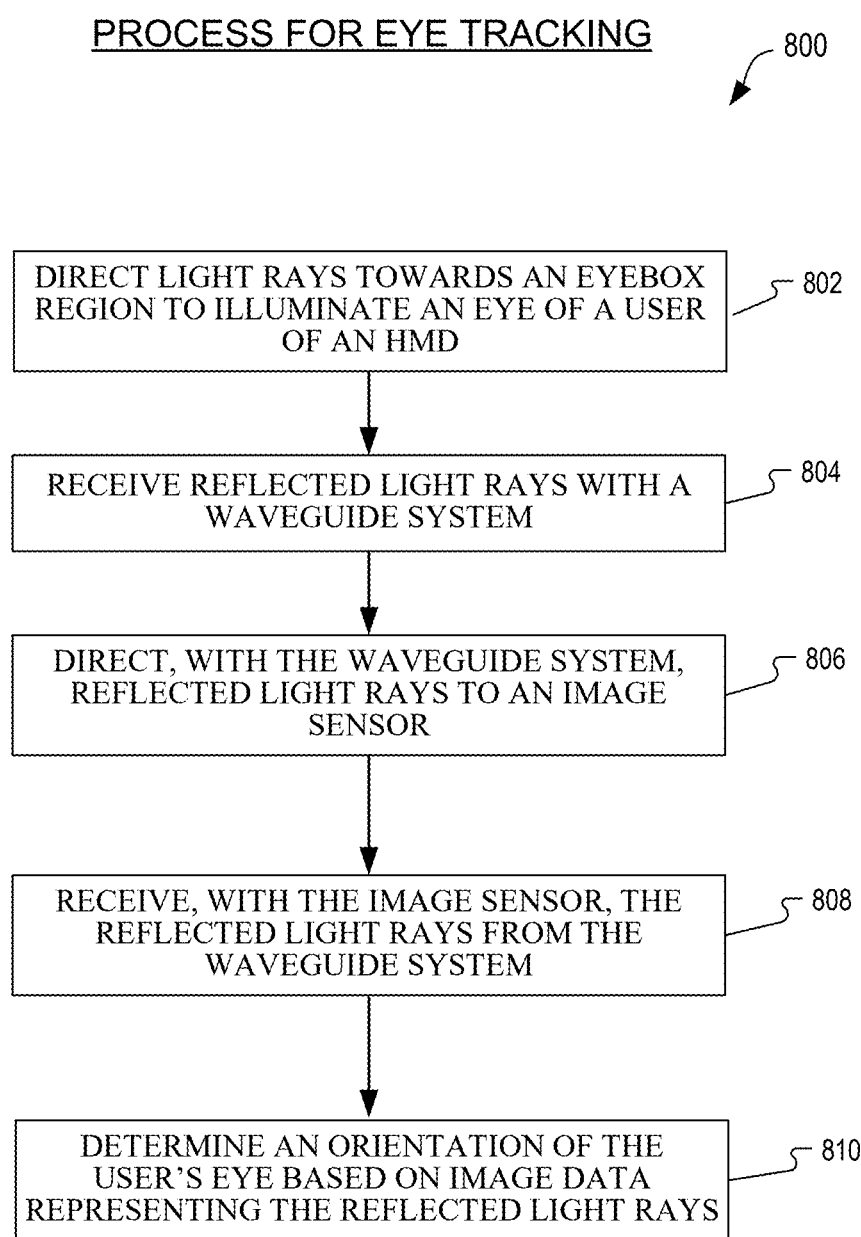
FIG. 8 illustrates a flow diagram of a process for eye tracking, in accordance with aspects of the disclosure.

FIG. 8 illustrates a process 800 for eye tracking, according to an embodiment. Process 800 may be at least partially incorporated into one or more HMDs (e.g., in controller 118) disclosed herein. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

At process block 802, process 800 directs light rays towards an eyebox region to illuminate an eye of a user of an HMD, according to an embodiment. Directing light rays towards eyebox region may include emitting infrared light towards eyebox region using one or more light sources (e.g., LEDs). Process block 802 may proceed to process block 804, according to an embodiment.

At process block 804, process 800 receives reflected light rays with a waveguide system, according to an embodiment. The waveguide system may include any of the waveguide systems disclosed herein and may include an in-coupling diffraction grating and an out-coupling diffraction grating positioned on or within a waveguide. The in-coupling diffraction grating and/or the out-coupling diffraction grating may be rolled diffraction gratings, in accordance with aspects of the disclosure. The waveguide system may be at least partially included in a lens assembly and may be at least partially positioned in a frame of an HMD. Process block 804 may proceed to process block 806, according to an embodiment.

At process block 806, process 800 directs, with the waveguide system, reflected light rays to an image sensor, according to an embodiment. The image sensor may be positioned in or on a frame of an HMD to receive the reflected light rays from the waveguide system. Process block 806 may proceed to process block 808, according to an embodiment.

At process block 808, process 800 receives, with the image sensor, the reflected light rays from the waveguide system, according to an embodiment. The image sensor may convert the reflected light rays from optical to electrical signals and save or provide the electrical signals to a controller as image data. Process block 808 proceeds to process block 810, according to an embodiment.

At process block 810, process 800 determines an orientation of the user's eye based on image data representing the reflected light rays, according to an embodiment.

FIGS. 9A-13 illustrate embodiments of telecentric and non-telecentric holographic optical elements (HOE) in a waveguide system and related processes, in accordance with aspects of the disclosure. The telecentric and non-telecentric HOE in the waveguide system may be configured to: i) spatially encode portions of the eyebox region and ii) expand the eyebox region from which reflections can be detected.

Figure 9A:
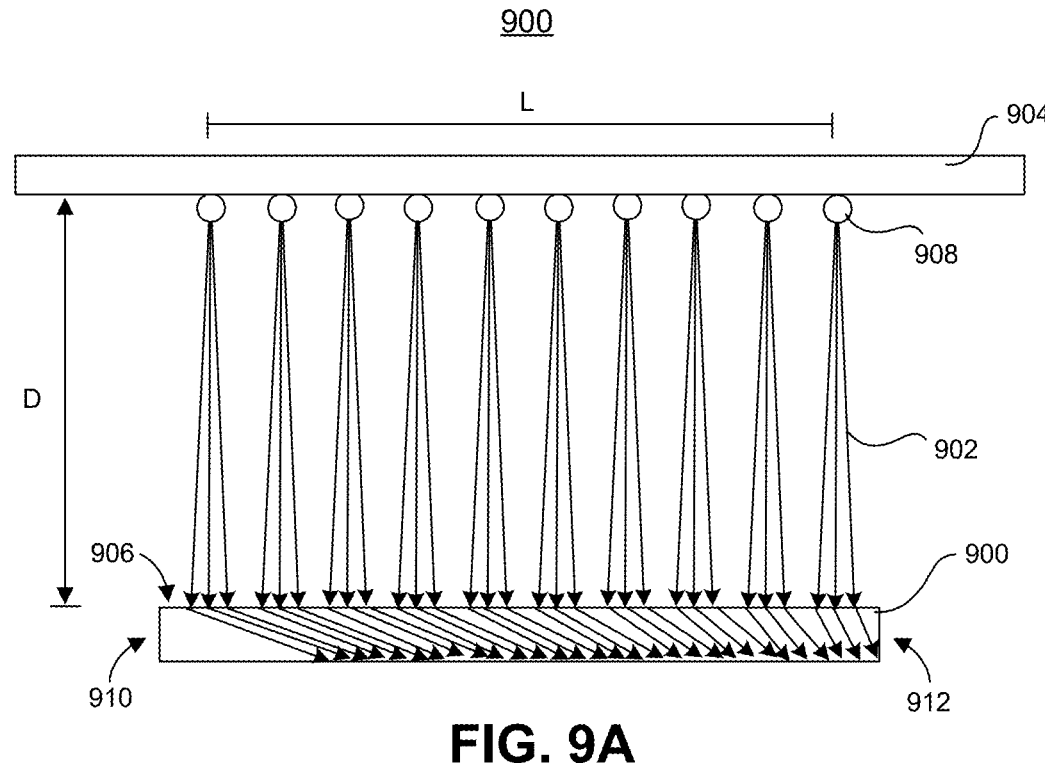
FIGS. 9A and 9B illustrate different views of a telecentric holographic optical element (HOE) operating on a number of light rays, in accordance with aspects of the disclosure.

FIG. 9A illustrates an example of a side view of a telecentric HOE 900 operating on a number of light rays 902, in accordance with aspects of the disclosure. Light rays 902 are incident on telecentric HOE 900 and represent reflections from (e.g., an eye in) an eyebox region 904, in accordance with aspects of the disclosure. Telecentric HOE 900 is configured to map, encode, and diffract light rays 902 into corresponding total internal reflection (TIR) angles within a waveguide (e.g., waveguide 222 shown in FIG. 2), according to an embodiment. For example, light rays incident on a first side of telecentric HOE 900 may be diffracted with a first diffraction and TIR angle, and light rays incident on a second side of telecentric HOE 900 may be diffracted with a second diffraction and TIR angle. The second diffraction angle may be smaller or larger than the first diffraction angle, according to various embodiments. Telecentric HOE 900 may be designed using one or more of the techniques associated with FIGS. 4A-7, for example. The telecentric aspect of telecentric HOE 900 relates to telecentric HOE 900 being configured to in-couple and map light rays 902 that originate substantially normal to an input surface 906 of telecentric HOE 900, according to an embodiment. In other words, telecentric refers to light rays that are coming from portions of eyebox region 904 that are directly above and normal to input surface 906, according to an embodiment.

Light rays 902 may originate from a number of point sources 908 in eyebox region 904. Point sources 908 are representative of reflections (e.g., specular reflections) off of a user's eye that is located in eyebox region 904. While 10 point sources 908 are shown for illustrative purposes, tens, hundreds, thousands, or millions of point sources 908 could originate from eyebox region 904 to provide light rays 902 onto telecentric HOE 900, according to an embodiment.

Similar to the diffraction gratings disclosed herein, telecentric HOE 900 may have a first end 910 that diffracts light rays 902 at a different angle than a second end 912. Telecentric HOE 900 is configured to increasingly change diffraction angles of incident light rays 902 from first end 910 to second end 912. First end 910 may be distal (e.g., further away) from an output diffraction grating, while second end 912 may be proximal (e.g., closer) to the output diffraction grating, according to an embodiment.

Telecentric HOE 900 may be configured to diffract light rays 902 based on eyebox region 904 being positioned a distance D from telecentric HOE 900, according to an embodiment. Telecentric HOE 900 may be configured to operate on light rays 902 that originate from within a length L of eyebox region 904. That is, length L represents a portion of eyebox region 904 that is normal to or directly above input surface 906. Telecentric HOE 900 is configured to in-couple and diffract light rays 902 to diffraction angles within a determined bandwidth. The bandwidth may include diffraction angles spanning from a critical angle $\theta_{crit}$ to 80°, according to an embodiment. The critical angle $\theta_{crit}$ may vary based on the properties of the waveguide and may be, for example, 30°. The critical angle may be an angle at which total internal reflection (TIR) fails to occur within the waveguide.

Telecentric HOE 900 is illustrated as an example of an HOE that is configured to operate in transmission to diffract light rays 902 into a waveguide with varying diffraction angles. However, telecentric HOE 900 may be fabricated with slanted grating planes and may be configured to operate in reflection (e.g., similar to waveguide imaging system 450 shown in FIG. 4B) to diffract light rays 902 into a waveguide.

Figure 9B:
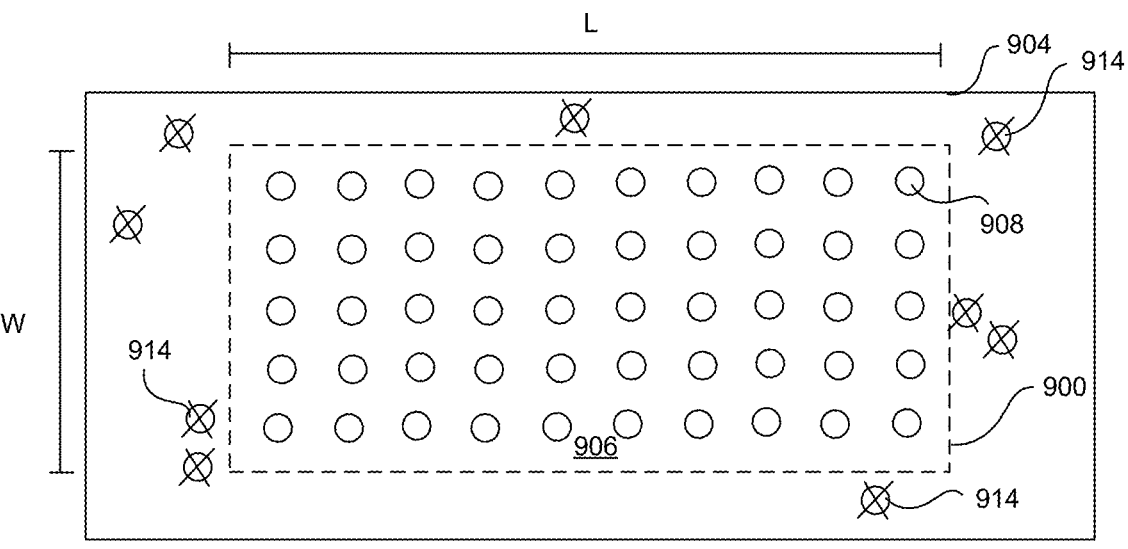

FIG. 9B illustrates a top view of telecentric HOE 900 and eyebox region 904, according to an embodiment. FIG. 9B illustrates that with a telecentric configuration or design, telecentric HOE 900 may be configured to omit or may preclude operations on light rays that originate from portions of eyebox region 904 that are not directly above or normal to input surface 906 of telecentric HOE 900. Point sources 914 are examples of sources of light rays that may pass through telecentric HOE 900 without diffractive operation, for example. Telecentric HOE 900 may be configured to operate on light rays 902 that originate from within length L and width W of eyebox region 904. Length L and width W represent a portion (e.g., an area) of eyebox region 904 that is normal to or directly above input surface 906.

Figure 10A:
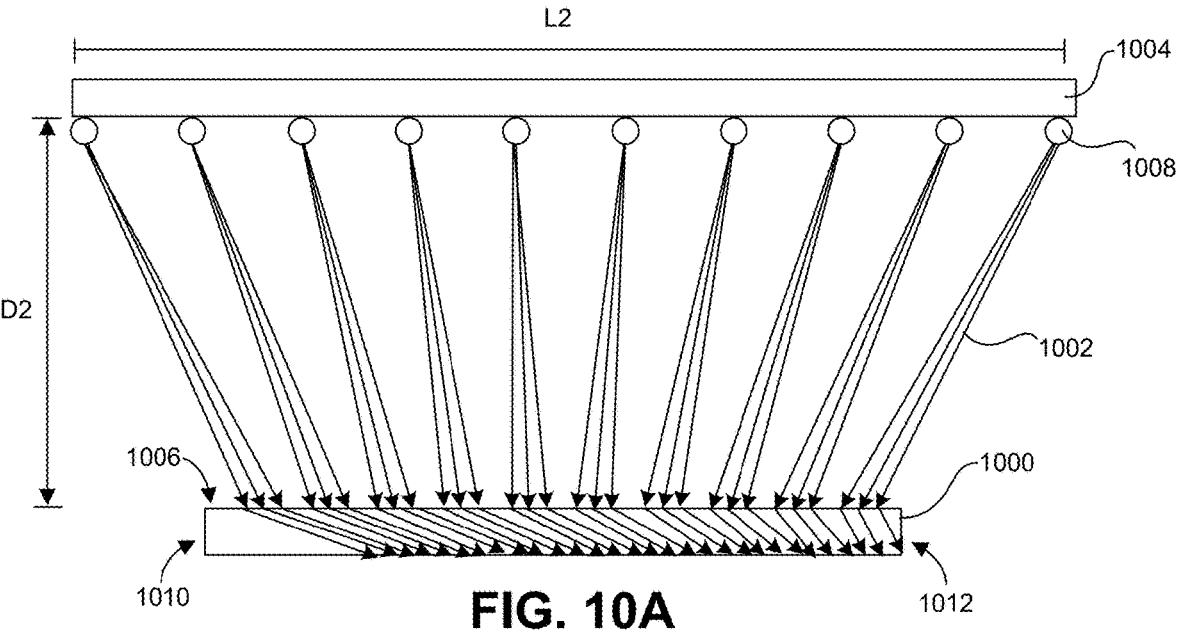
FIGS. 10A and 10B illustrate different views of a non-telecentric HOE operating on a number of light rays, in accordance with aspects of the disclosure

FIG. 10A illustrates an example of a side view of a non-telecentric HOE 1000 operating on a number of light rays 1002, in accordance with aspects of the disclosure.

Non-telecentric HOE 1000 may be implemented into a waveguide system as an in-coupling optical element (e.g., in waveguide system 216 and 452, shown in FIGS. 2 and 4B). Light rays 1002 are incident on non-telecentric HOE 1000 and represent reflections from (e.g., an eye in) an eyebox region 1004, in accordance with aspects of the disclosure. Non-telecentric HOE 1000 is configured to map, encode, and diffract light rays 1002 into corresponding TIR angles within a waveguide (e.g., waveguide 222 shown in FIG. 2), according to an embodiment. Non-telecentric HOE 1000 may be designed using one or more of the techniques associated with FIGS. 11-13 in addition to FIGS. 4A-7, for example. The non-telecentric aspect of non-telecentric HOE 1000 relates to non-telecentric HOE 1000 being configured to in-couple and map light rays 1002 that originate from outside of normal to an input surface 1006 of non-telecentric HOE 1000, according to an embodiment. Incident light rays that originate from a field of view (FOV) of eyebox region 1004 that is outside of a periphery of input surface 1006 may be referred to as oblique light rays. In other words, non-telecentric operation may refer to operating on light rays that are coming from portions of eyebox region 1004 that are not directly above and that are not normal to input surface 1006, according to an embodiment.

Light rays 1002 may originate from a number of point sources 1008 in eyebox region 1004. Point sources 1008 are representative of reflections (e.g., specular reflections) off of a user's eye while located in eyebox region 1004. While 11 point sources 1008 are shown for illustrative purposes, tens, hundreds, thousands, or millions of point sources 1008 could originate from eyebox region 1004 to provide light rays 1002 to non-telecentric HOE 1000, according to an embodiment.

Similar to the diffraction gratings disclosed herein, non-telecentric HOE 1000 may have a first end 1010 that diffracts light rays 1002 at a different angle than a second end 1012. Non-telecentric HOE 1000 is configured to increasingly change (e.g., increase or decrease) diffraction angles of incident light rays 1002 from first end 1010 to second end 1012. First end 1010 may be distal (e.g., further away) from an out-coupling diffraction grating, while second end 1012 may be proximal (e.g., closer) to the out-coupling diffraction grating, according to an embodiment.

Non-telecentric HOE 1000 may be configured to diffract light rays 1002 based on eyebox region 1004 being positioned a distance D2 from non-telecentric HOE 1000, according to an embodiment. Non-telecentric HOE 1000 may be configured to operate on light rays 1002 that originate from within a length L2 of eyebox region 1004. That is, length L2 represents a portion of eyebox region 1004 that is above input surface 1006 but that also extends laterally and external to the peripheral border of input surface 1006. Because non-telecentric HOE 1000 maps or encodes point sources 1008 from a greater area (length L2 by width W2) than telecentric HOE 900, the resolution (e.g., points per square inch) may be lower than the resolution provided by telecentric HOE 900. Advantageously, the trade-off for lower resolution is an expanded FOV region of reflection detection from eyebox region 1004, according to an embodiment.

Non-telecentric HOE 1000 is configured to in-couple and diffract light rays 1002 to diffraction angles within a determined bandwidth. The bandwidth may include diffraction angles spanning from a critical angle $\theta_{crit}$ to 80° (e.g., nearly glancing but still operating in TIR), according to an embodiment. The critical angle $\theta_{crit}$ may vary based on the properties of the waveguide and may be, for example, 30°.

Non-telecentric HOE 1000 is illustrated as an example of an HOE that is configured to operate in transmission to diffract light rays 1002 into a waveguide with varying diffraction angles. However, non-telecentric HOE 1000 may be fabricated with slanted grating planes and configured to operate in reflection (e.g., similar to waveguide imaging system 450 shown in FIG. 4B) to diffract light rays 1002 into a waveguide.

Figure 10B:
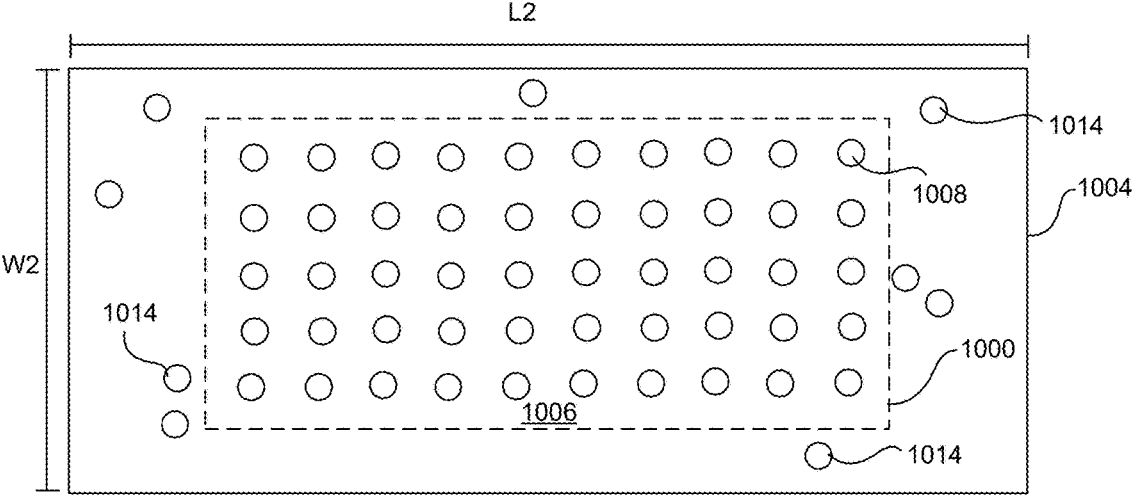

FIG. 10B illustrates a top view of non-telecentric HOE 1000 and eyebox region 1004, according to an embodiment. FIG. 10B illustrates that with a non-telecentric configuration or design, non-telecentric HOE 1000 may be configured to operate on oblique incident light rays that originate from a FOV of eyebox region 1004 that is at least partially outside a periphery of input surface 1006, according to embodiments of the disclosure. Point sources 1014 are examples of sources of light rays that may be oblique and still be operated on by non-telecentric HOE 1000, for example.

Figure 11:
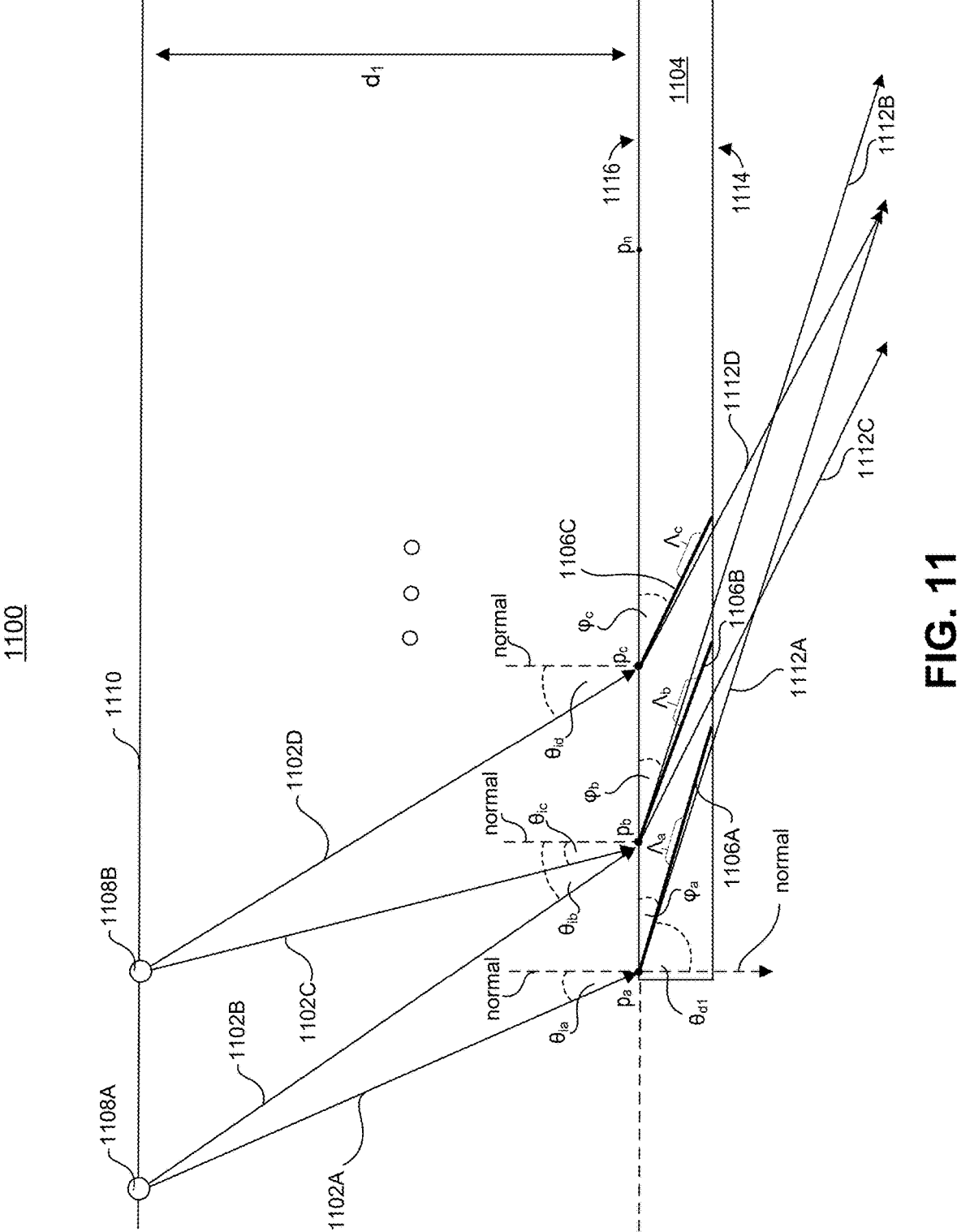
FIG. 11 illustrates a diagram for defining characteristics of a non-telecentric HOE, in accordance with aspects of the disclosure.

FIG. 11 illustrates a diagram 1100 for defining characteristics of a non-telecentric HOE 1104, in accordance with embodiments of the disclosure. Non-telecentric HOE 1104 may be used as an in-coupling diffraction grating in, for example, waveguide systems 102, 216, 402, 452 and/or 602, according to an embodiment. Diagram 1100 illustrates light rays 1102 (individually, light ray 1102A, 1102B, 1102C, 1102D) incident upon non-telecentric HOE 1104 at a variety of positions p (individually, position $p_a$, $p_b$, $p_c$, $p_n$) to determine or define diffraction angles, grating periods, and slant angles of slanted grating planes 1106 (individually, slanted grating planes 1106A, 1106B, 1106C), in accordance with aspects of the disclosure. Non-telecentric HOE 1104 may be configured to operate in transmission or reflection to diffract incident light rays, according to various embodiments.

Various characteristics of slanted grating planes 1106 define the diffractive properties of non-telecentric HOE 1104, according to an embodiment. Slanted grating planes 1106 operate on light rays 1102 to diffract the light at diffraction angles that vary from one end of non-telecentric HOE 1104 to the other end of non-telecentric HOE 1104. Slanted grating planes 1106 are recorded within the volume or body of non-telecentric HOE 1104, which includes a recording medium and may include two or more additional transparent layers. If incident light is in the designed wavelength range and has an incident angle that is within the designed range, non-telecentric HOE 1104 is configured to operate on the light to diffractively in-couple the light into a waveguide, according to an embodiment. Each of slanted grating planes 1106 can be configured to diffract light at a different angle, so the position of incidence (e.g., position $p_a$, position $p_b$, etc.) of incident light may determine the diffraction angle of the light because of the particular slanted grating plane that is at the particular position of incidence.

To define a first slanted grating plane 1106A, a first slant angle $\varphi_a$ at a first point $p_a$, a grating period $\Lambda_a$, and an angular bandwidth $\delta\theta_a$ are determined. A diffraction angle $\theta_{d1}$ may be defined (e.g., pre-determined) to be nearly glancing (e.g., approximately) 80° for an exit ray 1112A of a first light ray 1102A. An incident angle $\theta_{ia}$ for first light ray 1102A may be set based on how much non-telecentric coverage is desired. For example, incident angle $\theta_{ia}$ may be set at 20°-30° to provide expanded coverage of an eyebox region, according to an embodiment. First light ray 1102A originates from a point source 1108A from an object plane 1110 that is a distance $d_1$ from non-telecentric HOE 1104. Object plane 1110 is the plane from which point sources 1108 are illuminated and represents a distance to an eyebox region. First ray 1102A has an incident angle $\theta_{ia}$ of 30°, for example. First slant angle $\varphi_a$ and grating period $\Lambda_a$ of a first slanted grating plane 1106A may be adjusted until diffraction angle $\theta_{d1}$ for a first exit ray 1112A of first light ray 1102A is approximately 80° (or nearly glancing). Grating period $\Lambda_a$ is a transversal distance between adjacent grating lines on slanted grating plane 1106A and is based on the wavelength of light that is being selectively diffracted (e.g., 850 nm). Diffraction angle $\theta_{d1}$ may be measured from a normal to a surface (e.g., top or bottom exit surface) of non-telecentric HOE 1104.

Once the grating period $\Lambda_a$ and slant angle $\varphi_a$ for first slanted grating plane 1106A have been determined at first point $p_a$ to achieve a particular diffraction angle, an angular bandwidth $\delta\theta_a$ of first slanted grating plane 1106A at first point $p_a$ is determined. As an example, angular bandwidth $\delta\theta_a$ may be determined by directing various light rays at first point $p_a$ with different incident angles until slanted grating plane 1106A stops operating on the input light rays. Alternatively, angular bandwidth $\delta\theta_a$ may be determined by directing various light rays at first point $p_a$ with different incident angles until the angle of diffraction exceeds a predetermined threshold (e.g., 35°).

Having determined angular bandwidth $\delta\theta_a$, a second light ray 1102B is emitted or directed to a second point $p_b$ from the same point source 1108A as first light ray 1102A. Second light ray 1102B is directed towards second point $p_b$ at an incident angle $\theta_{ib}$ that is equal to the sum of $\theta_{ia}+\delta\theta_a$ (incident angle $\theta_{ia}$ plus angular bandwidth $\delta\theta_a$). The diffraction angle of second light ray 1102B may be predetermined or set to be the same as first light ray 1102A (e.g., 80°). Grating period $\Lambda_b$ and slant angle $\varphi_b$ for second slanted grating plane 1106B are then adjusted until exit ray 1112B has the predetermined diffraction angle. After the grating period $\Lambda_b$ and slant angle $\varphi_b$ for second slanted grating plane 1106B have been determined at second point $p_b$, angular bandwidth $\delta\theta_{b,r2}$ of second light ray 1102B at second point $p_b$ is determined.

Additional characteristics of second slanted grating plane 1106B may be determined based on angular bandwidth $\delta\theta_{b,r2}$. A third light ray 1102C is emitted or directed to second point $p_b$ from a point source 1108B. Third light ray 1102C is directed towards second point $p_b$ at an incident angle $\theta_{ic}$, which defines the location of point source 1108B on object plane 1110. Incident angle $\theta_{ic}$ of third light ray 1102C is defined by the difference of $\theta_{ib}-\delta\theta_{b,r2}$ (incident angle $\theta_{ib}$ minus angular bandwidth $\delta\theta_{b,r2}$ of second ray 1102B on second slanted grating plane 1106B at second point $p_b$). The diffraction angle of third light ray 1102 is determined by, for example, measuring the diffraction angle of exit ray 1112C from an exit surface 1114 of non-telecentric HOE 1104, according to an embodiment. The exit surface may be input surface 1116, when non-telecentric HOE 1104 is implemented to operate reflectively in diffraction, according to an embodiment. Angular bandwidth $\delta\theta_{b,r3}$ of third light ray 1102C is determined from, for example, second point source 1108B on second slanted grating plane 1106B using third light ray 1102C.

Using angular bandwidth $\delta\theta_{b,r3}$ of third light ray 1102C, characteristics of a third slanted grating plane 1106C are determined and defined, in accordance with embodiments of the disclosure. Fourth light ray 1102D may be directed towards non-telecentric HOE 1104 from second point source 1108B with an incident angle $\theta_{id}$. Incident angle $\theta_{id}$ of fourth light ray 1102D may be defined by the sum of $\theta_{ic}+\delta\theta_{b,r3}$ (incident angle $\theta_{ic}$ plus angular bandwidth $\delta\theta_{b,r3}$ of third ray 1102C at second point $p_b$). Third slanted grating plane

1106C may then be configured to diffract fourth light ray 1102D with the same diffraction angle as third light ray 1102C. Grating period $\Lambda_c$ and slant angle $\varphi_c$ for third slanted grating plane 1106C are adjusted until exit ray 1112D has the same diffraction angle as exit ray 1112C, according to an embodiment.

The general process described for determining characteristics and properties of slanted grating planes 1106A, 1106B, and 1106C may be repeatedly applied until the diffraction angle of subsequent exit rays reach a critical angle where TIR no longer occurs within the waveguide, for example. The general process described for determining characteristics and properties of slanted grating planes 1106A, 1106B, and 1106C may be repeatedly applied across the (e.g., entire) length of non-telecentric HOE 1104, according to an embodiment.

In some embodiments, the process of identifying and defining characteristics of non-telecentric HOE 1104 is performed by one or more processors configured to operate fabrication or manufacturing equipment used to, for example, record and/or test optical elements, diffraction gratings, waveguide systems, waveguide imaging systems, and/or HMDs, according to various embodiments.

FIG. 12 illustrates a process 1200 for manufacturing a non-telecentric HOE, according to an embodiment. Process 1200 may be at least partially incorporated into one or more processors of, for example, optics fabrication equipment. The order in which some or all of the process blocks appear in process 1200 should not be deemed limiting. Rather, one of ordinary skill in the art having the benefit of the present disclosure will understand that some of the process blocks may be executed in a variety of orders not illustrated, or even in parallel.

At process block 1202, process 1200 defines characteristics of a first slanted grating plane, according to an embodiment. A first light ray may be directed to a first point on a non-telecentric HOE. The first slanted grating plane may be defined by adjusting a slant angle and grating period of the first slanted grating plane until a first exit ray of a first light ray reaches a pre-determined diffraction angle, e.g., 80°. The first light ray originates from a first source location that is outside of the normal (or any normal) to the in-coupling surface (e.g., input surface 1116 shown in FIG. 11), to enable the non-telecentric HOE to operate on light rays received from outside of the normal to the in-coupling surface, according to an embodiment. The first light ray originates from outside a periphery of the in-coupling or input surface of the non-telecentric HOE, according to an embodiment. As such, the first light ray may be referred to as an oblique light ray. The first light ray may have a first incident angle that is less than 90° and may be, for example, in the range of 20°-30°. Process block 1202 may proceed to process block 1204, according to an embodiment.

At process block 1204, process 1200 determines a first angular bandwidth of the first slanted grating plane by directing light at the non-telecentric HOE from a number of angles, according to an embodiment. Process block 1204 may proceed to process block 1206, according to an embodiment.

At process block 1206, process 1200 determines characteristics of a second slanted grating plane based on the first angular bandwidth of the first slanted grating plane, according to an embodiment. A second light ray from the first source location may be directed toward the non-telecentric HOE at a second point. The incident angle of the second ray may be defined as the incident angle of the first light ray plus the first angular bandwidth of the first slanted grating plane.

A slant angle and grating period of the second grating plane at the second point may be adjusted until the second exit ray (from the second light ray) has the same diffraction angle as the first exit ray (from the first light ray). Process block 1206 may proceed to process block 1208, according to an embodiment.

At process block 1208, process 1200 determines a second angular bandwidth of the second slanted grating plane for the second ray from around the first source location, according to an embodiment. Process block 1208 may proceed to process block 1210, according to an embodiment.

At process block 1210, process 1200 determines a third angular bandwidth of a third light ray originating from a second source location, according to an embodiment. The third light ray is directed to the second point on the non-telecentric HOE, according to an embodiment. The second source location for the third light ray is defined based on the third incident angle of the third light ray. The third incident angle is defined as the second incident angle minus the second angular bandwidth of the second light ray on the first point. Using the second slanted grating plane that has been defined, a third angular bandwidth is determined for the third light ray from around the second source location. Process block 1210 may proceed to process block 1212, according to an embodiment.

At process block 1212, process 1200 determines characteristics of a third slanted grating plane based on the third angular bandwidth of the second slanted grating plane, according to an embodiment. The third angular bandwidth is determined using, for example, the third light ray from the second source location, according to an embodiment. A fourth light ray from the second source location may be directed toward the non-telecentric HOE at a third point. The fourth incident angle of the fourth light ray may be defined as the third incident angle of the first ray plus the third angular bandwidth of the second slanted grating plane. A slant angle and grating period of the third slanted grating plane at the third point may be adjusted until the fourth exit ray (from the fourth light ray) has the same diffraction angle as the third exit ray (from the third light ray), according to an embodiment. Process block 1212 proceeds to process block 1206 to define additional slanted grating planes until a critical angle is reached and the diffraction angle of an exit ray is too small to support TIR operations, according to an embodiment.

FIG. 13 illustrates a process 1300 for manufacturing a non-telecentric HOE, according to an embodiment. Process 1300 may be at least partially incorporated into one or more processors of, for example, optics fabrication equipment. The order in which some or all of the process blocks appear in process 1300 should not be deemed limiting. Rather, one of ordinary skill in the art having the benefit of the present disclosure will understand that some of the process blocks may be executed in a variety of orders not illustrated, or even in parallel.

At process block 1302, process 1300 illuminates a holographic optical element (HOE) with a first light ray that is oblique to an input surface of the HOE, wherein the first light ray originates from outside a periphery of the input surface, according to an embodiment. Process block 1302 may proceed to process block 1304, according to an embodiment.

At process block 1304, process 1300 adjusts characteristics of a first grating plane in the HOE until a first diffraction angle of the first light ray reaches a first predetermined diffraction angle value, according to an embodiment. Process block 1304 may proceed to process block 1306, according to an embodiment.

At process block 1306, process 1300 determines a first angular bandwidth of the first grating plane, according to an embodiment. Process block 1306 may proceed to process block 1308, according to an embodiment.

At process block 1308, process 1300 illuminates the HOE with one or more additional light rays, wherein at least some of the one or more additional light rays originate from outside the periphery of the input surface, wherein incident angles of the one or more additional light rays are at least partially based on the first angular bandwidth, according to an embodiment. Process block 1308 may proceed to process block 1310, according to an embodiment.

At process block 1310, process 1300 defines characteristics of one or more additional grating planes in the HOE until one or more additional diffraction angles of the one or more additional light rays become one or more additional predetermined diffraction angle values, according to an embodiment. Process 1300 ends with process block 1310, according to an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., controller 118, processing logic 120) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., memories 122) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens assembly comprising:
a waveguide;
an out-coupling diffraction grating at least partially disposed within the waveguide and configured to out-couple light from the waveguide; and
a holographic optical element (HOE) at least partially disposed within the waveguide, wherein:
an input surface of the HOE shares an input surface of the waveguide;
the HOE is configured to gradually change diffraction angles of a plurality of incident light rays based on a plurality of diffraction grating planes comprising slanted grating planes with differing grating periods across the HOE from a first end to a second end of the HOE; and
the HOE is configured to map the plurality of incident light rays to a corresponding plurality of total internal reflection (TIR) angles, wherein the plurality of incident light rays include oblique light rays that are non-normal to the input surface of the HOE and extends laterally outside of a peripheral border of the input surface of the HOE.

2. The lens assembly of claim 1, wherein the first end is distal to the out-coupling diffraction grating, wherein the second end is proximal to the out-coupling diffraction grating, wherein the HOE is configured to receive first ones of the plurality of incident light rays at the first end, wherein the HOE is configured to diffract the first ones of the plurality of incident light rays with a first one of the TIR angles, wherein the HOE is configured to receive second ones of the plurality of incident light rays at the second end, wherein the HOE is configured to diffract the second ones of the plurality of incident light rays with a second one of the TIR angles.

3. The lens assembly of claim 2, wherein the HOE is configured to receive third ones of the plurality of incident light rays between the first end and the second end, wherein the HOE is configured to diffract the third ones of the plurality of incident light rays with third ones of the TIR angles, wherein the third ones of the TIR angles gradually change from the first end to the second end of the HOE.

4. The lens assembly of claim 1, wherein the HOE is a volume Bragg grating.

5. The lens assembly of claim 1, wherein the HOE is configured to diffractively operate in reflection.

6. The lens assembly of claim 1, wherein the HOE includes the plurality of diffraction grating planes configured to diffract the plurality of incident light rays.

7. The lens assembly of claim 6, wherein each of the plurality of diffraction grating planes is configured to diffract the plurality of incident light rays to a corresponding one of the plurality of TIR angles.

8. The lens assembly of claim 7, wherein a first of the plurality of diffraction grating planes includes first characteristics that are at least partially defined based on one of the oblique light rays originating from outside a periphery of a first end of the input surface of the HOE.

9. The lens assembly of claim 8, wherein a second of the plurality of diffraction grating planes includes second characteristics that are at least partially defined based on one of the oblique light rays originating from outside a periphery of a second end of the input surface of the HOE.

10. The lens assembly of claim 6, wherein at least some of the diffraction grating planes have characteristics that are defined at least partially based on an angular bandwidth of an adjacent one of the diffraction grating planes.

11. The lens assembly of claim 6, wherein each of the slanted grating planes includes a corresponding one of a plurality of slant angles, wherein each of the plurality of slant angles is greater or less than an adjacent one of the plurality of slant angles.

12. A head mounted device comprising:
a frame; and
a lens assembly coupled to the frame, wherein the lens assembly includes:
a waveguide;
an out-coupling diffraction grating at least partially disposed within the waveguide and configured to out-couple light from the waveguide; and
a holographic optical element (HOE) at least partially disposed within the waveguide, wherein:
an input surface of the HOE shares an input surface of the waveguide;
the HOE is configured to gradually change diffraction angles of a plurality of incident light rays based on a plurality of diffraction grating planes comprising slanted grating planes with differing grating periods across the HOE from a first end to a second end of the HOE; and the HOE is configured to in-couple oblique light rays from a field-of-view (FOV) of an eyebox region that extends laterally beyond a peripheral border of the input surface of the HOE.

13. The lens assembly of claim 1, wherein the HOE is configured to diffract the plurality of light rays to cause the light rays to exit through the input surface of the HOE.

14. The head mounted device of claim 12, wherein the HOE is configured to map the plurality of incident light rays to a corresponding plurality of total internal reflection (TIR) angles, wherein the plurality of incident light rays include the oblique light rays, wherein at least some of the oblique light rays are non-normal to the input surface of the HOE.

15. The head mounted device of claim 14, wherein the HOE includes a plurality of diffraction grating planes configured to diffract the plurality of incident light rays into the waveguide.

16. The head mounted device of claim 15, wherein each of the plurality of diffraction grating planes is configured to diffract the plurality of incident light rays to a corresponding one of a plurality of TIR angles.

17. The head mounted device of claim 15, wherein at least some of the diffraction grating planes have characteristics that are defined at least partially based on an angular bandwidth of an adjacent one of the diffraction grating planes.

18. A method comprising:
    illuminating a holographic optical element (HOE) with a first light ray that is oblique to an input surface of the HOE, the HOE partially disposed within a waveguide and sharing an input surface of the HOE with an input surface of the waveguide and the HOE configured to gradually change diffraction angles of a plurality of incident light rays based on a plurality of diffraction grating planes comprising slanted grating planes with differing grating periods across the HOE from a first end to a second end of the HOE, wherein the first light ray extends laterally beyond a peripheral border of the input surface of the HOE;

adjusting characteristics of a first grating plane in the HOE until a first diffraction angle of the first light ray reaches a first predetermined diffraction angle value;

determining a first angular bandwidth of the first grating plane;

illuminating the HOE with one or more additional light rays, wherein at least some of the one or more additional light rays originate from outside the peripheral border of the input surface of the HOE, wherein incident angles of the one or more additional light rays are at least partially based on the first angular bandwidth; and adjusting characteristics of one or more additional grating planes in the HOE until one or more additional diffraction angles of the one or more additional light rays become one or more additional predetermined diffraction angle values.

19. The method of claim 18, wherein the characteristics of the first grating plane include a slant angle and a grating line period.

20. The method of claim 18, wherein the one or more additional light rays include a corresponding one of one or more slant angles, wherein each of the one or more slant angles is greater or lesser than an adjacent one of the one or more slant angles.

\* \* \* \* \*